(12) United States Patent
Khashan

(10) Patent No.: US 12,382,291 B2
(45) Date of Patent: Aug. 5, 2025

(54) SYSTEM FOR DETECTING MALICIOUS NODES IN A WIRELESS SENSOR NETWORK AND A METHOD THEREOF

(71) Applicant: Osama Ahmed Khashan, Abu Dhabi (AE)

(72) Inventor: Osama Ahmed Khashan, Abu Dhabi (AE)

( * ) Notice: Subject to any disclaimer, the term of this patent is extended or adjusted under 35 U.S.C. 154(b) by 0 days.

(21) Appl. No.: 19/098,535

(22) Filed: Apr. 2, 2025

(65) Prior Publication Data

US 2025/0234201 A1    Jul. 17, 2025

(51) Int. Cl.
*H04W 12/121*    (2021.01)

(52) U.S. Cl.
CPC ................. *H04W 12/121* (2021.01)

(58) Field of Classification Search
CPC .................................... H04W 12/121
See application file for complete search history.

(56) References Cited

U.S. PATENT DOCUMENTS

| | | | | |
|---|---|---|---|---|
| 11,075,934 B1* | 7/2021 | Aldhaheri | ............ | G06N 3/048 |
| 2012/0197856 A1* | 8/2012 | Banka | ................ | H04L 67/2885 |
| | | | | 707/706 |
| 2015/0193697 A1* | 7/2015 | Vasseur | .................... | G06N 3/02 |
| | | | | 706/12 |
| 2016/0119365 A1* | 4/2016 | Barel | ...................... | G06F 16/95 |
| | | | | 726/12 |
| 2020/0293655 A1* | 9/2020 | Long | ...................... | G06N 20/00 |

OTHER PUBLICATIONS

Dwivedi et al., "A Study on Machine Learning Based Anomaly Detection Approaches in Wireless Sensor Network", Jan. 2020, 10th International Conference on Cloud Computing, Data Science & Engineering, pp. 194-199 (Year: 2020).*

(Continued)

*Primary Examiner* — Kenneth W Chang
(74) *Attorney, Agent, or Firm* — Perilla Knox & Hildebrandt LLP; Kenneth A. Knox

(57) ABSTRACT

The present disclosure generally relates to a two-stage system for detecting malicious nodes in Wireless Sensor Networks (WSNs), enhancing network security and resilience. The system employs a distributed approach, leveraging Cluster Heads (CHs) and a central server for efficient and accurate detection. Initially, sensor nodes are monitored for comprehensive node and network metrics, statistically ranked by significance in identifying malicious behavior. CHs perform a resource-aware first-stage detection based on their resource weight, filtering potential threats locally. Results are then aggregated at a server for a second-stage analysis using a hybrid Machine Learning (ML) and Deep Learning (DL) approach. This advanced analysis, combined with statistically relevant metrics, significantly improves detection accuracy. By integrating resource-conscious CH operation with powerful server-side ML/DL, this system offers a scalable, energy-efficient, and highly effective solution for securing WSNs against malicious node attacks, surpassing traditional detection methods in both speed and precision.

20 Claims, 14 Drawing Sheets

(56) References Cited

OTHER PUBLICATIONS

Ghosh et al., ("Outlier Detection in Sensor Data using Machine Learning Techniques for IoT Framework and Wireless Sensor Networks: A Brief Study", May 2019, International Conference on Applied Machine Learning, pp. 187-190 (Year: 2019).*

Gurram, G. V., Shariff, N. C., & Biradar, R. L. (2022). A secure energy aware meta-heuristic routing protocol (SEAMHR) for sustainable IoT-WSN. Theoretical Computer Science, 930, 63-76. https://doi.org/10.1016/j.tcs.2022.07.011.

Khashan, O. A. (2024). Aligning security and energy-efficiency using change detection and partial encryption for wireless camera networks. Engineering Science and Technology, an International Journal, 53, 101689. https://doi.org/10.1016/j.jestch.2024.101689.

Khashan, O. A., & Khafajah, N. M. (2023). Efficient hybrid centralized and blockchain-based authentication architecture for heterogeneous IoT systems. Journal of King Saud University—Computer and Information Sciences, 35(2), 726-739. https://doi.org/10.1016/j.jksuci.2023.01.011.

Khashan, O. A., Khafajah, N. M., Alomoush, W., & Alshinwan, M. (2024). Innovative energy-efficient proxy re-encryption for secure data exchange in wireless sensor networks. IEEE Access, 12, 23290-23304. https://doi.org/10.1109/ACCESS.2024.3360488.

Lai, Y., Tong, L., Liu, J., Wang, Y., Tang, T., Zhao, Z., & Qin, H. (2022). Identifying malicious nodes in wireless sensor networks based on correlation detection. Computers & Security, 113, 102540. https://doi.org/10.1016/j.cose.2021.102540.

Chandnani, N., & Khairnar, C. N. (2022). An analysis of architecture, framework, security and challenging aspects for data aggregation and routing techniques in IoT WSNs. Theoretical Computer Science, 929, 95-113. https://doi.org/10.1016/j.tcs.2022.06.032.

Khashan, O. A., Khafajah, N. M., Alomoush, W., Alshinwan, M., Alamri, S., Atawneh, S., & Alsmadi, M. K. (2023). Dynamic multimedia encryption using a parallel file system based on multi-core processors. Cryptography, 7(1), 12. https://doi.org/10.3390/cryptography7010012.

Alrahhal, H., Jamous, R., Ramadan, R., Alayba, A. M., & Yadav, K. (2022). Utilising acknowledge for the trust in wireless sensor networks. Applied Sciences, 12(4), 2045. https://doi.org/10.3390/app12042045.

Abubaker, Z., Javaid, N., Almogren, A., Akbar, M., Zuair, M., & Ben-Othman, J. (2022). Blockchained service provisioning and malicious node detection via federated learning in scalable Internet of Sensor Things networks. Computer Networks, 204, 108691. https://doi.org/10.1016/j.comnet.2021.108691.

Ali, S., Li, Q., & Yousafzai, A. (2024). Blockchain and federated learning-based intrusion detection approaches for edge-enabled industrial IoT networks: A survey. Ad Hoc Networks, 152, 103320. https://doi.org/10.1016/j.adhoc.2023.103320.

Han, Y., Hu, H., & Guo, Y. (2022). Energy-aware and trust-based secure routing protocol for wireless sensor networks using adaptive genetic algorithm. IEEE Access, 10, 11538-11550. https://doi.org/10.1109/ACCESS.2022.3144015.

Nouman, M., Qasim, U., Nasir, H., Almasoud, A., Imran, M., & Javaid, N. (2023). Malicious node detection using machine learning and distributed data storage using blockchain in WSNs. IEEE Access, 11, 6106-6121. https://doi.org/10.1109/ACCESS.2023.3236983.

Almotairi, A., Atawneh, S., Khashan, O. A., & Khafajah, N. M. (2024). Enhancing intrusion detection in IoT networks using machine learning-based feature selection and ensemble models. Systems Science & Control Engineering, 12(1). https://doi.org/10.1080/21642583.2024.2321381.

Rashid, K., Saeed, Y., Ali, A., Jamil, F., Alkanhel, R., & Muthanna, A. (2023). An adaptive real-time malicious node detection framework using machine learning in vehicular ad-hoc networks (VANETs). Sensors, 23(5), 2594. https://doi.org/10.3390/s23052594.

Tanwar, S., Bhatia, Q., Patel, P., Kumari, A., Singh, P. K., & Hong, W.-C. (2020). Machine learning adoption in blockchain-based smart applications: The challenges, and a way forward. IEEE Access, 8, 474-488. https://doi.org/10.1109/ACCESS.2019.2961372.

Khashan, O. A., Khafajah, N. M., Alomoush, W., Alshinwan, M., & Alomari, E. (2024). Smart energy-efficient encryption for wireless multimedia sensor networks using deep learning. IEEE Open Journal of the Communications Society, 5, 5745-5763. https://doi.org/10.1109/OJCOMS.2024.3442855.

Uddin, M. N., & Nyeem, H. (2024). Engineering a multi-sensor surveillance system with secure alerting for next-generation threat detection and response. Results in Engineering, 22, 101984. https://doi.org/10.1016/j.rineng.2024.101984.

Khashan, O. A., Zin, A. M., & Sundararajan, E. A. (2015). ImgFS: A transparent cryptography for stored images using a filesystem in userspace. Frontiers in Information Technology & Electronic Engineering, 16(1), 28-42. https://doi.org/10.1631/FITEE.1400133.

Khashan, O. A., Alamri, S., Alomoush, W., Alsmadi, M. K., Atawneh, S., & Mir, U. (2023). Blockchain-based decentralized authentication model for IoT-based e-learning and educational environments. Computers, Materials & Continua, 75(2), 3133-3158. https://doi.org/10.32604/cmc.2023.036217.

Khashan, O. A., Ahmad, R., & Khafajah, N. M. (2021). An automated lightweight encryption scheme for secure and energy-efficient communication in wireless sensor networks. Ad Hoc Networks, 115, 102448. https://doi.org/10.1016/j.adhoc.2021.102448.

Khan, U., Agrawal, S., & Silakari, S. (2015). Detection of malicious nodes (DMN) in vehicular ad-hoc networks. Procedia Computer Science, 46, 965-972. https://doi.org/10.1016/j.procs.2015.01.006.

Yun, J., Seo, S., & Chung, J.-M. (2018). Centralized trust-based secure routing in wireless networks. IEEE Wireless Communications Letters, 7(6), 1066-1069. https://doi.org/10.1109/LWC.2018.2858231.

Jaint, B., Indu, S., Pandey, N., & Pahwa, K. (2019). Malicious node detection in wireless sensor networks using support vector machine. In Proceedings of the 2019 3rd International Conference on Recent Developments in Control, Automation & Power Engineering (RDCAPE) (pp. 247-252). IEEE. https://doi.org/10.1109/RDCAPE47089.2019.8979125.

Rathore, H., & Badarla, V. R. (2014). Novel approach for security in wireless sensor network using bio-inspirations. In Proceedings of the 2014 Sixth International Conference on Communication Systems and Networks (COMSNETS). IEEE. https://doi.org/10.1109/COMSNETS.2014.6734875.

Khan, T., Singh, K., Shariq, M., Ahmad, K., Savita, K. S., Ahmadian, A., Salahshour, S., & Conti, M. (2023). An efficient trust-based decision-making approach for WSNs: Machine learning oriented approach. Computer Communications, 209, 217-229. https://doi.org/10.1016/j.comcom.2023.06.014.

Tangade, S., Kumaar, R. A., M. S, M. S., & Azam, F. (2022). Detection of malicious nodes in flying ad-hoc network with supervised machine learning. In 2022 Third International Conference on Smart Technologies in Computing, Electrical and Electronics (ICSTCEE), Bengaluru, India, 1-5. https://doi.org/10.1109/ICSTCEE56972.2022.10099989.

Xu, X., & Lin, J. C. W. (2023). Abnormal nodes sensing model in regional wireless networks based on convolutional neural network. Wireless Networks, 29(6), 2981-2992. https://doi.org/10.1007/s11276-023-03255-2.

Moka, M., Serome, K., & Selvaraj, R. (2024). An iterative convolutional neural network based malicious node detection (ICNNMND) protocol for Internet of Things. Wireless Personal Communications, 137(3), 1217-1232. https://doi.org/10.1007/s11277-024-11459-8.

Kumar, M., Mukherjee, P., Verma, K., Verma, S., & Rawat, D. B. (2022). Improved deep convolutional neural network based malicious node detection and energy-efficient data transmission in wireless sensor networks. IEEE Transactions on Network Science and Engineering, 9(5), 3272-3281. https://doi.org/10.1109/TNSE.2021.3098011.

Jayadhas, S., Roslin, E., & Wilfred, F. (2023). Deep learning model-based malicious node detection system in wireless multimedia sensor network. https://doi.org/10.21203/rs.3.rs-3066855/v1.

Jiang, W. (2022). Graph-based deep learning for communication networks: A survey. Computer Communications, 185, 40-54. https://doi.org/10.1016/j.comcom.2021.12.015.

(56) References Cited

OTHER PUBLICATIONS

Gharavian, V., Khosrowshahli, R., Mahmoud, Q. H., Makrehchi, M., & Rahnamayan, S. (2023). Intrusion detection for wireless sensor network using graph neural networks. In 2023 IEEE Symposium Series on Computational Intelligence (SSCI) (pp. 807-813). IEEE. https://doi.org/10.1109/SSCI52147.2023.10372004.

Scardapane, S., Spinelli, I., & Di Lorenzo, P. (2021). Distributed training of graph convolutional networks. IEEE Transactions on Signal and Information Processing over Networks, 7, 87-100. https://doi.org/10.1109/TSIPN.2020.3046237.

Elsadig, M. A. (2023). Detection of denial-of-service attack in wireless sensor networks: A lightweight machine learning approach. IEEE Access, 11, 83537-83552. https://doi.org/10.1109/ACCESS.2023.3303113.

Bansal, M., Goyal, A., & Choudhary, A. (2022). A comparative analysis of K-Nearest Neighbor, Genetic, Support Vector Machine, Decision Tree, and Long Short Term Memory algorithms in machine learning. Decision Analytics Journal, 3, 100071. https://doi.org/10.1016/j.dajour.2022.100071.

\* cited by examiner

200

→ 202 calculating, by at least one cluster head (CH) in the WSN, a resource weight based on at least one resource metric of the CH, wherein the at least one resource metric of the CH comprises at least one of: resource utilization at the CH (RUCH), battery level of the CH (BtCH), connectivity status (Cst) representing the number of sensor nodes associated with the CH, and signal-to-noise ratio (SNR)

→ 204 performing, by the at least one CH, a first-stage malicious node detection based on the calculated resource weight by applying dynamic threshold detection to sensor data received at the CH and utilizing a hybrid machine learning (ML) technique to analyze the sensor data and the dynamic thresholds at the CH level, wherein the thresholds are dynamically adjusted based on the calculated resource weight → 206 performing, by a server communicatively coupled with the at least one CH, a second-stage malicious node detection based on results from the first-stage malicious node detection, wherein the second-stage malicious node detection utilizes a combination of machine learning (ML) and deep learning (DL) techniques for enhanced detection accuracy → 208 updating at least one threshold parameter used in the first-stage malicious node detection based on results from the second-stage malicious node detection

Figure 2

| Feature | Data Type | Min | Max |
|---|---|---|---|
| Bandwidth | float64 | 24.044248 | 169.797139 |
| Battery_Level | float64 | 31.440133 | 119.009948 |
| CPU_Usage | float64 | -0.89049 | 91.038421 |
| Data_Reception_Frequency | float64 | 3.372971 | 33.894688 |
| Data_Throughput | float64 | 11.519978 | 175.846021 |
| Data_Transmission_Frequency | float64 | 3.66176 | 95.247997 |
| Energy_Consumption_Rate | float64 | 1.483981 | 15.309509 |
| Error_Rate | float64 | 0.026954 | 0.345463 |
| IP_Address | object | - | - |
| Is_Malicious | int64 | 0.0 | 1.0 |
| Memory_Usage | float64 | 10.265487 | 57.655692 |
| Node_ID | int64 | 1.0 | 10,000.0 |
| Number_of_Neighbors | int64 | -2.0 | 12.0 |
| Packet_Drop_Rate | float64 | -0.273674 | 6.839591 |
| Packet_Duplication_Rate | float64 | 0.212105 | 1.750646 |
| Packet_Rate | float64 | 15.615783 | 113.825524 |
| Route_Reply_Frequency | float64 | 2.910179 | 26.380494 |
| Route_Request_Frequency | float64 | 2.276865 | 22.926287 |
| SNR | float64 | -3.666482 | 38.561371 |
| Signal_Strength | float64 | -69.574136 | -24.428469 |
| Timestamp | object | - | - |

Figure 13

| Parameter | Details |
|---|---|
| WSN area size | 500 m × 500 m |
| Number of sensor nodes | 50-250 nodes |
| Simulation time | 400 s |
| Modulation standard | Zigbee/IEEE 802.15.4 |
| Max data rates | 250 kbps |
| Packet size | 1000 bits |
| Initial power | 3 J (joule) |
| Transmit/receive power level | 50 nJ/bit |
| Power consumption per block | 0.001 J for 32 bits |
| Power consumption per round | 0.001 J |
| Data aggregation power | 5 nJ/bit/signal |
| Free space loss | 10 nJ/bit |
| Antenna type | Omni-directional |
| Propagation model | Free space path loss |
| MAC protocol | CSMA/CA |

Figure 14

SYSTEM FOR DETECTING MALICIOUS NODES IN A WIRELESS SENSOR NETWORK AND A METHOD THEREOF

TECHNICAL FIELD

The present disclosure relates to the field of wireless sensor networks (WSNs) and, more particularly, to a system and method for detecting malicious nodes within a WSN. The disclosure leverages node-specific and network-wide metrics to identify anomalies indicative of security threats. It utilizes statistical and machine learning-based classification techniques to enhance the detection accuracy of compromised nodes. The system aims to improve network integrity, prevent unauthorized data access, and mitigate potential cyber threats that could disrupt WSN operations.

BACKGROUND

Wireless Sensor Networks (WSNs) have emerged as critical infrastructure in a multitude of domains, ranging from environmental monitoring and military surveillance to smart cities and industrial automation. These intelligent, distributed systems, composed of numerous sensor nodes communicating wirelessly, offer unprecedented capabilities for data collection and real-time analysis in diverse and often remote environments. The compact nature and low-cost deployment of sensor nodes (SNs) belie their sophisticated functionalities, which are increasingly enhanced by integrating advanced technologies like energy harvesting, machine learning (ML), and Internet of Things (IoT) paradigms.

However, the very characteristics that make WSNs advantageous—their wireless nature, distributed architecture, and deployment in often unsecured environments—also render them inherently vulnerable. SNs are resource-constrained devices, operating with limited processing power, battery life, memory, and bandwidth. This resource scarcity, coupled with the open and often unattended deployment locations, makes WSNs prime targets for a range of security threats.

A significant challenge within WSNs arises from the potential presence of malicious nodes (MNs). Unlike faulty nodes, which exhibit irregular behavior due to malfunctions, MNs are deliberately compromised by adversaries. Once under external control, these MNs can initiate a spectrum of disruptive attacks, including denial-of-service, data manipulation, and infiltration of malware. Such malicious activities can severely compromise data integrity, disrupt network operations, and undermine the reliability of the entire WSN system.

The open nature of WSN communication protocols and their deployment in vulnerable environments exacerbate these security concerns. Traditional security measures often prove inadequate in the face of sophisticated attacks orchestrated by MNs. Centralized authentication schemes, for instance, can become single points of failure. Moreover, internal attacks, where compromised nodes within the network turn malicious, pose significant challenges to security mechanisms that assume node reliability.

Existing approaches to detect MNs, such as trust-based systems that monitor node behavior and message transmission, have demonstrated limitations. These methods can be slow to detect threats, struggle against multiple simultaneous attack types, and often introduce significant energy overhead—a critical concern for resource-constrained WSNs. Furthermore, the evolving sophistication of malicious actors necessitates detection mechanisms that are not only effective but also adaptive and resource-efficient.

Traditional machine learning (ML) and deep learning (DL) techniques offer promise for enhancing WSN security, yet their direct application within SNs is often hindered by the computational limitations of these devices. While cluster heads (CHs) can perform some initial data processing, simplistic ML/DL methods at this level may be insufficient to detect complex and dynamic malicious behaviors. Centralized processing of all sensor data at a server, on the other hand, becomes impractical due to the sheer volume of data and potential risks associated with transmitting all data across the network.

Therefore, there is an urgent need for a novel, efficient, and robust system for detecting malicious nodes in WSNs. This system must overcome the limitations of existing methods by operating effectively in resource-constrained environments, minimizing energy consumption and computational overhead on SNs and providing real-time or near real-time detection to enable prompt responses to security threats. Being adaptable to evolving attack strategies and capable of detecting diverse types of malicious activities. Leveraging the advancements in ML and DL in a way that is practical and efficient for WSN deployments.

In view of the foregoing discussion, it is portrayed that there is a need to have a system and method for detecting malicious nodes in a wireless sensor network (WSN).

BRIEF SUMMARY

The present disclosure seeks to provide a dual-stage malicious nodes detection system that harnesses machine learning to enhance MN identification in WSNs. The initial stage uses dynamic threshold detection and decision-tree techniques at the cluster head (CH) level. This adaptive detection process optimizes CH resource levels, feature counts, and threshold values for efficient MN identification. When thresholds are exceeded, the second stage activates on the server side, employing an advanced MN detection model that seamlessly integrates a hybrid convolutional neural network and a random forest classifier to boost detection accuracy. Leveraging Sensor-NetGuard, a dataset with diverse node and network features, further enhances reliability. Extensive analysis shows that our scheme achieves up to 99.5% detection accuracy at the CH level and nearly 100% at the server side. The average execution time is 124.63 ms, making it 97% faster than conventional methods. Additionally, DSMND reduces CH power consumption by up to 70% and extends network lifetime by 2.7 times compared to existing methods. These results confirm the effectiveness of our approach for real-time detection and mitigation of MNs within WSNs.

In an embodiment, a system for detecting malicious nodes in a wireless sensor network (WSN) is disclosed. The system includes a plurality of sensor nodes deployed in the WSN.

The system further includes a data acquisition unit connected to the plurality of sensor nodes operably configured to monitor a plurality of nodes in the wireless sensor network to obtain node metrics comprising at least one of packet rate, packet drop rate, packet duplication rate, signal strength, signal-to-noise ratio, error rate, CPU usage, memory usage, and bandwidth usage for each of the plurality of nodes and monitor the wireless sensor network to obtain network metrics comprising at least one of data throughput, energy consumption rate, number of neighbors, route request frequency, route reply frequency, data transmission frequency, and data reception frequency.

The system further includes a ranking unit operably configured to rank the node metrics and network metrics based on their statistical significance in identifying malicious nodes, using a chi-squared statistic or other statistical measure of independence from a target variable indicative of maliciousness.

The system further includes at least one cluster head (CH) coupled with the data acquisition unit and ranking unit, wherein the at least one CH is configured to calculate a resource weight based on at least one resource metric selected from node metrics and network metrics of the CH and perform a first-stage malicious node detection based on the calculated resource weight.

The system further includes a server in connection with the at least one CH, wherein the server is configured to receive results from the first-stage malicious node detection performed by the at least one CH and perform a second-stage malicious node detection based on the received results, utilizing a combination of machine learning (ML) and deep learning (DL) techniques for enhanced detection accuracy.

In another embodiment, a method for detecting malicious nodes in a wireless sensor network (WSN) is disclosed. The method includes calculating, by at least one cluster head (CH) in the WSN, a resource weight based on at least one resource metric of the CH, wherein the at least one resource metric of the CH comprises at least one of: resource utilization at the CH (RUCH), battery level of the CH (BtCH), connectivity status (Cst) representing the number of sensor nodes associated with the CH, and signal-to-noise ratio (SNR).

The method further includes performing, by the at least one CH, a first-stage malicious node detection based on the calculated resource weight by applying dynamic threshold detection to sensor data received at the CH and utilizing a hybrid machine learning (ML) technique to analyze the sensor data and the dynamic thresholds at the CH level, wherein the thresholds are dynamically adjusted based on the calculated resource weight.

The method further includes performing, by a server communicatively coupled with the at least one CH, a second-stage malicious node detection based on results from the first-stage malicious node detection, wherein the second-stage malicious node detection utilizes a combination of machine learning (ML) and deep learning (DL) techniques for enhanced detection accuracy.

The method further includes updating at least one threshold parameter used in the first-stage malicious node detection based on results from the second-stage malicious node detection.

An object of the present disclosure is to provide a dual-stage system for malicious node (MN) detection in Wireless Sensor Networks (WSNs), effectively integrating hybrid Machine Learning (ML) techniques to enhance security.

Another object of the present disclosure is to implement an adaptive dynamic threshold detection mechanism at the CH level that dynamically adjusts detection parameters based on both current CH resource availability and feature characteristics, optimizing resource utilization and maintaining detection performance.

Another object of the present disclosure is to provide a real-time or near real-time MN detection capability that allows for timely responses to security threats and minimizes potential damage from malicious activities within the WSN.

Yet another object of the present invention is to deliver an expeditious and cost-effective method for detecting malicious nodes in a wireless sensor network (WSN).

To further clarify the advantages and features of the present disclosure, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail in the accompanying drawings.

BRIEF DESCRIPTION OF FIGURES

These and other features, aspects, and advantages of the present disclosure will become better understood when the following detailed description is read concerning the accompanying drawings in which like characters represent like parts throughout the drawings, wherein:

FIG. 2 illustrates a flow chart of a method for detecting malicious nodes in a wireless sensor network (WSN) in accordance with an embodiment of the present disclosure;

FIG. 13 illustrates a Table depicting Summary of Dataset Features for Malicious Node Detection in accordance with an embodiment of the present disclosure; and FIG. 14 illustrates a Table depicting Network simulation parameters employed in accordance with an embodiment of the present disclosure.

Figure 1:
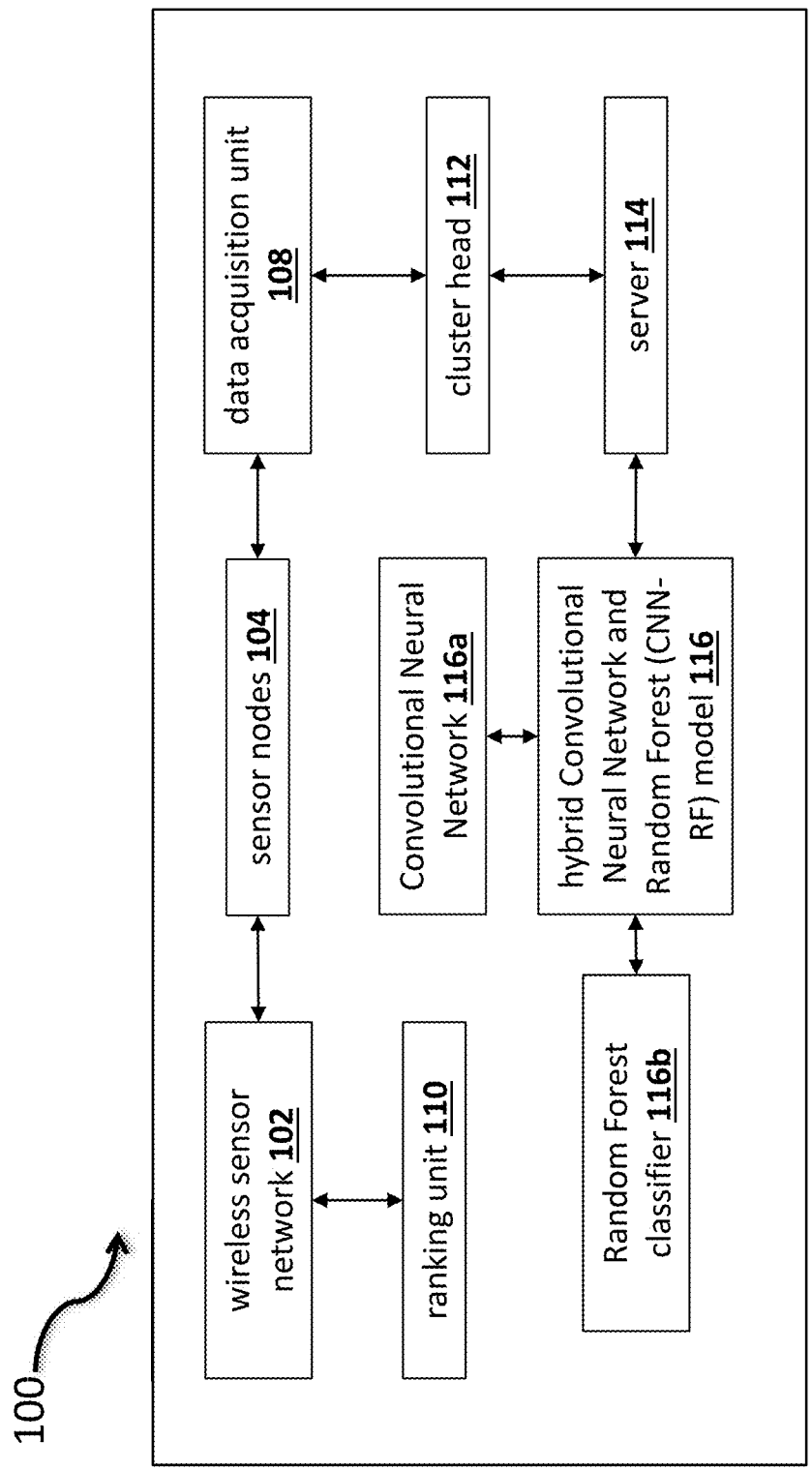
FIG. 1 illustrates a block diagram of a system for detecting malicious nodes in a wireless sensor network (WSN) in accordance with an embodiment of the present disclosure.

Further, skilled artisans will appreciate those elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

To promote an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail concerning the accompanying drawings.

Referring to FIG. 1, a block diagram of a system for detecting malicious nodes in a wireless sensor network (WSN) is illustrated in accordance with an embodiment of the present disclosure. The system (100) includes a plurality of sensor nodes (104) deployed in the WSN (102).

In an embodiment, a data acquisition unit (108) is connected to the plurality of sensor nodes (104) operably configured to monitor a plurality of nodes in the wireless sensor network to obtain node metrics comprising at least one of packet rate, packet drop rate, packet duplication rate, signal strength, signal-to-noise ratio, error rate, CPU usage, memory usage, and bandwidth usage for each of the plurality of nodes and monitor the wireless sensor network to obtain network metrics comprising at least one of data throughput, energy consumption rate, number of neighbors, route request frequency, route reply frequency, data transmission frequency, and data reception frequency.

In an embodiment, a ranking unit (110) is operably configured to rank the node metrics and network metrics based on their statistical significance in identifying malicious nodes, using a chi-squared statistic or other statistical measure of independence from a target variable indicative of maliciousness.

In an embodiment, at least one cluster head (CH) (112) is coupled with the data acquisition unit (108) and ranking unit (110), wherein the at least one CH (112) is configured to calculate a resource weight based on at least one resource metric selected from node metrics and network metrics of the CH (112) and perform a first-stage malicious node detection based on the calculated resource weight.

In an embodiment, a server (114) is in connection with the at least one CH (112), wherein the server (114) is configured to receive results from the first-stage malicious node detection performed by the at least one CH (112) and perform a second-stage malicious node detection based on the received results, utilizing a combination of machine learning (ML) and deep learning (DL) techniques for enhanced detection accuracy.

In another embodiment, the first-stage malicious node detection performed by the at least one CH (112) comprises applying dynamic threshold detection to sensor data received from the subset of sensor nodes (104), wherein the thresholds are dynamically adjusted based on the calculated resource weight.

Yet, in another embodiment, the first-stage malicious node detection further utilizes a hybrid machine learning (ML) technique to analyze the sensor data and the dynamic thresholds, wherein the hybrid ML technique utilized in the first-stage malicious node detection at the CH level comprises a decision tree (DT) classifier, wherein the decision tree (DT) classifier is configured to analyze data flagged by the dynamic threshold detection as potentially anomalous and classify sensor nodes (104) as benign or malicious based on a rule set derived from training data, wherein the dynamic threshold detection and the decision tree (DT) classifier operate collaboratively, wherein the dynamic threshold detection flags potential anomalies based on current network conditions and the decision tree (DT) classifier analyzes the flagged anomalies to determine if they signify malicious behavior.

In one embodiment, the server (114) is further configured to update at least one threshold parameter used in the first-stage malicious node detection based on results from the second-stage malicious node detection.

In a further embodiment, calculating the resource weight comprises monitoring the at least one resource metric of the CH (112) selected from the group consisting of: resource utilization at the CH (RUCH), battery level of the CH (112) (BtCH), connectivity status (Cst) representing the number of sensor nodes (104) associated with the CH (112), and signal-to-noise ratio (SNR) and calculating a resource weight parameter ($\varphi r$) based on the monitored resource metrics.

In one of the above embodiments, the dynamic threshold detection in the first-stage malicious node detection is applied to a subset of features selected from a feature set comprising individual node metrics and network-wide metrics, to optimize resource utilization at the CH level, wherein the dynamic thresholds are initially calibrated based on system requirements and data features and subsequently adapted and adjusted based on evaluations related to node trust and detection of malicious nodes, wherein the evaluation related to node trust comprises assigning and updating trust values (T) to sensor nodes (104), wherein a higher trust value indicates greater sensor node reliability, wherein the dynamic thresholds are adjusted in response to changes in the trust values (T) of sensor nodes (104), such that threshold values are increased if a malicious node is detected or the trust value (T) falls below a threshold and threshold values are decreased if no malicious nodes are detected and the trust value (T) is high.

Yet, in a further embodiment, the feature set comprises at least one of: packet rate, packet drop rate, packet duplication rate, signal strength, signal-to-noise ratio (SNR), data throughput, energy consumption rate, number of neighbors, route request frequency, route reply frequency, data transmission frequency, data reception frequency, error rate, CPU usage, memory usage, and bandwidth usage.

In another embodiment, the combination of ML and DL techniques utilized in the second-stage malicious node detection at the server level comprises a hybrid Convolutional Neural Network and Random Forest (CNN-RF) model (116), wherein the CNN-RF model (116) is activated upon receiving results from the first-stage malicious node detection indicating a potential malicious node or a low trust value for a sensor node, wherein the CNN-RF model (116) comprises at least one Convolutional Neural Network (CNN) (116a) configured to extract feature vectors from a comprehensive dataset comprising features from the WSN (102) nodes, wherein the at least one CNN (116a) comprises multiple convolutional layers, each convolutional layer consisting a plurality of filters, a kernel size, and a Rectified Linear Unit (ReLU) activation function and a Random Forest (RF) classifier (116b) configured to classify sensor nodes (104) as malicious or benign based on the feature vectors extracted by the CNN (116a).

In an embodiment, the data acquisition unit is further configured to: continuously aggregate raw sensor node data received at predetermined intervals; pre-process the aggregated data by performing noise filtering through a median filter and normalization using min-max scaling prior to the extraction of node and network metrics; wherein said pre-processing reduces false positive detections by removing spurious data points and normalizing data distributions to improve accuracy during malicious node detection, wherein the ranking unit is further configured to: perform an iterative chi-squared evaluation on historical sensor data received from the plurality of sensor nodes and network metrics periodically at runtime; adaptively update the statistical significance rankings of node and network metrics based on changing data patterns detected during network operation; wherein dynamically updated ranking enhances real-time adaptability of metrics employed in detecting evolving malicious node behaviors, and wherein the hybrid ML technique implemented at the cluster head (CH) level further comprises: generating and updating an interpretable rule set from the decision tree (DT) classifier during runtime based on dynamic threshold detections flagged as anomalous; applying fuzzy logic decision mechanisms for borderline cases where DT classifier confidence falls below a predefined confidence threshold; wherein said fuzzy logic decisions dynamically weigh multiple node metrics and adaptively balance between sensitivity and specificity, enhancing the first-stage detection accuracy at the CH level.

In an embodiment, the data acquisition unit of the system is configured to operate continuously, collecting raw data from a plurality of sensor nodes deployed across the wireless sensor network (WSN) at predetermined time intervals. This temporal structuring of data acquisition ensures consistent monitoring while maintaining synchronization across the network. The collected data is then subjected to a pre-processing pipeline that includes noise filtering through a median filter, which is particularly effective in mitigating the influence of impulsive noise by replacing each data point with the median of neighboring values. This step effectively eliminates spurious spikes that can distort feature distributions. Following noise removal, normalization using min-max scaling is performed to rescale each node and network metric to a common range, typically [0,1], thereby standardizing input data and making it suitable for downstream machine learning models. This pre-processing significantly enhances the signal-to-noise ratio and mitigates the influence of outliers, directly reducing the incidence of false positives in malicious node detection.

Further, the system incorporates a ranking unit that plays a critical role in feature selection by executing an iterative chi-squared evaluation algorithm on the historical data accumulated from sensor nodes. At runtime, this evaluation is repeated periodically to reflect current operating conditions. The chi-squared algorithm calculates the statistical dependence between each metric and a known classification label (e.g., benign or malicious), generating a significance ranking for each feature. This dynamic ranking adapts over time, recalibrating which node and network metrics are most predictive of malicious behavior as data patterns shift due to environmental changes or evolving attack strategies. For example, metrics such as packet transmission rate, signal strength variance, and node uptime may rise or fall in significance depending on the tactics used by an attacker. By recalibrating rankings in real time, the system ensures that only the most relevant features are prioritized, improving the robustness and adaptability of the detection model.

At the cluster head (CH) level, a hybrid machine learning technique is deployed for first-stage anomaly detection. The CH generates an interpretable rule set using a decision tree (DT) classifier, which is constructed and updated dynamically during runtime. The DT classifier creates logical decision boundaries based on input features, allowing for human-understandable rules such as "if packet loss >0.3 and signal variance <0.1, then node is suspicious." These rules evolve as new data is ingested and anomalous patterns are detected, enabling the CH to respond to new behaviors in near real-time. For edge cases—those where the DT classifier's confidence score falls below a predefined threshold—a fuzzy logic-based decision mechanism is activated. Fuzzy logic evaluates inputs not in binary terms but on a spectrum of values, thus handling uncertainty and ambiguity in decision-making. It computes a weighted decision by considering multiple node metrics, such as residual energy, packet drop rate, and historical reliability scores, thereby dynamically balancing between false positive and false negative rates. This multi-criteria evaluation enhances both the sensitivity (true positive rate) and specificity (true negative rate) of the first-stage detection mechanism, particularly in borderline or ambiguous cases.

The combined effect of continuous data aggregation, rigorous pre-processing, adaptive feature ranking, and the CH-level hybrid detection model ensures high technical efficacy. The system remains responsive to behavioral changes in the network, can dynamically adapt to emerging threats, and minimizes erroneous classifications through a layered and interpretable decision process, fully enabling the claimed functionality and supporting real-time, reliable malicious node detection in resource-constrained WSN environments.

In an embodiment, the CNN-RF model utilized in the second-stage malicious node detection further comprises: integrating a multi-scale convolutional feature extraction strategy, wherein convolutional layers concurrently process data inputs at multiple temporal scales to identify short-term anomalies and long-term behavioral changes; wherein extracted multi-scale feature vectors from convolutional layers are concatenated and provided as input to the Random Forest classifier, increasing precision by detecting both immediate threats and prolonged anomalous patterns in node behavior, and wherein the server updates threshold parameters through: executing a feedback loop configured to evaluate false positive and false negative rates from the second-stage malicious node detection over sliding historical windows; automatically adjusting threshold parameters using reinforcement learning wherein reward signals correspond inversely to cumulative detection errors; wherein said reinforcement learning dynamically optimizes thresholds in a self-adaptive manner to minimize misclassification rates, significantly enhancing system resilience against new malicious behaviors.

In an embodiment, the system leverages a Convolutional Neural Network-Random Forest (CNN-RF) hybrid model at the second-stage malicious node detection level, specifically designed to enhance the accuracy and robustness of detecting both transient and persistent anomalies in wireless sensor network (WSN) node behavior. The CNN component is configured with a multi-scale convolutional feature extraction strategy, wherein multiple convolutional layers are employed in parallel to process temporal sequences of sensor node and network metrics across varying time scales. For instance, one convolutional path may use a short kernel size (e.g., 3-time steps) to capture fine-grained, short-term anomalies such as sudden drops in signal strength or transmission bursts, while another path may utilize a longer kernel (e.g., 15 or 30-time steps) to detect gradual behavioral deviations like increasing latency or slow degradation in node reliability. This multi-scale architecture enables the CNN to build a comprehensive feature map that includes both localized and long-term behavioral cues indicative of malicious activity.

The outputs from each temporal scale convolutional path are concatenated into a unified multi-scale feature vector that represents a holistic summary of each sensor node's operational behavior over time. This aggregated feature vector is then passed as input to the Random Forest (RF) classifier, a robust ensemble learning model well-suited for handling high-dimensional and non-linear data. The RF component uses a set of decision trees trained on different subsets of the input features and data samples, producing individual predictions that are aggregated through majority voting or weighted averaging. This two-stage CNN-RF architecture significantly increases detection precision by combining deep temporal pattern extraction with the interpretability and generalization power of ensemble learning, enabling the system to distinguish between immediate threats—such as data injection or spoofing—and more subtle, prolonged anomalies like node impersonation or selective forwarding.

To further enhance detection performance and reduce reliance on static configurations, the server component integrates an adaptive feedback loop mechanism designed to continuously monitor the effectiveness of the second-stage detection module. This loop evaluates the model's performance over sliding historical windows, calculating false positive and false negative rates based on the comparison of predictions against verified outcomes. These performance metrics are used to guide a reinforcement learning (RL) algorithm tasked with dynamically adjusting threshold parameters used within the CNN-RF detection process. The RL agent operates by receiving a reward signal that is inversely proportional to the cumulative detection error, such that a lower misclassification rate yields a higher reward. Over time, this learning process converges to an optimal set of thresholds that maximize classification accuracy under varying network and threat conditions.

For example, if the system observes an increasing number of false positives when detecting packet delay anomalies, the RL agent may lower the sensitivity threshold for that particular behavior class, thereby improving specificity. Conversely, if false negatives rise for low-variance signal manipulation attacks, the threshold is adjusted to improve sensitivity. This self-adaptive mechanism ensures that the system is not only reactive but also proactively tuned to current network dynamics, reducing the need for manual recalibration and enhancing overall resilience against both known and emerging malicious node behaviors. The combination of multi-scale CNN feature extraction, ensemble classification with RF, and self-learning threshold optimization via reinforcement learning offers a powerful, technically rigorous solution that fully enables the claimed functionality and significantly strengthens WSN security against evolving threats.

In an embodiment, the at least one CH is further configured to: perform compressed sensing-based data summarization to reduce the dimensionality of node and network metrics transmitted to the server; wherein the compressed sensing employs sparse signal reconstruction algorithms enabling CH-level data reduction without loss of critical anomaly indicators, thus effectively preserving detection accuracy while minimizing communication overhead, and wherein the trust values (T) assigned to sensor nodes at the CH level are further updated through: integrating blockchain-based trust validation wherein each sensor node periodically appends cryptographic signatures representing recent activity patterns onto a distributed ledger; the CH querying the distributed ledger to verify and cross-check historical activity logs submitted by sensor nodes against real-time observed behaviors.

In an embodiment, each cluster head (CH) is further enhanced with capabilities for efficient data summarization and trust validation to optimize both communication efficiency and integrity in malicious node detection. To address the issue of high communication overhead typically associated with transmitting high-dimensional node and network metrics to the central server, the CH implements a compressed sensing-based data summarization technique. Compressed sensing is a signal processing method that enables the accurate reconstruction of a high-dimensional signal from a small number of measurements, provided the signal exhibits sparsity in some domain. In this system, CHs leverage sparse signal reconstruction algorithms, such as Basis Pursuit or Orthogonal Matching Pursuit, to encode the raw feature space into a compressed representation before transmission. For example, temporal metrics like packet delivery ratios, node mobility variance, or energy consumption trends, which often contain redundant or minimally informative data points, are sparsely encoded and transmitted in a lower-dimensional form. Upon receipt at the server or an upstream processor, these compressed signals can be reconstructed with minimal loss using the pre-established sparsifying basis. This process allows CHs to significantly reduce the volume of transmitted data while ensuring that key anomaly-indicative features are preserved. As a result, the system maintains high detection accuracy with substantially lower communication bandwidth, which is particularly vital in resource-constrained WSN environments.

In addition to data compression, the CHs are also configured to enhance security and reliability in node behavior assessment by integrating a blockchain-based trust validation mechanism. In this framework, each sensor node periodically generates a cryptographic signature summarizing its recent operational activity. This signature may include hashed summaries of communication behavior, energy usage, and responsiveness, which are then appended to a blockchain—a distributed, tamper-resistant ledger shared across trusted nodes in the network. By using blockchain, the system ensures that all historical activity logs of sensor nodes are immutably recorded and verifiable. Each CH can query this ledger in real-time to cross-check whether the observed behaviors of a particular node align with its declared activity history. For instance, if a node claims regular energy-efficient transmission behavior but the CH observes repeated packet flooding or erratic signal bursts, a discrepancy is flagged. The CH uses these comparisons to update the trust value (T) assigned to each node dynamically, either penalizing or reinforcing the node's trustworthiness score based on the consistency of current actions with past records stored on the blockchain.

This combination of compressed sensing and blockchain-based trust validation provides both technical and operational efficacy. The former ensures that bandwidth consumption remains low without compromising on detection quality, while the latter introduces a decentralized, verifiable, and tamper-proof mechanism to authenticate node behavior. Together, these mechanisms significantly enhance the system's resilience and scalability, enabling secure, efficient, and accurate malicious node detection even in large-scale and heterogeneous WSN deployments. This embodiment not only enables but further strengthens the implementation of the claimed invention, particularly in settings where communication constraints and trust verification are critical.

In an embodiment, the server is further configured to: perform federated incremental learning by locally training CNN-RF models across distributed cluster heads without requiring raw data transmission; aggregating locally trained model parameters at regular intervals and updating a global model deployed on the server-side; redistributing the optimized global model parameters back to the cluster heads to enhance their detection accuracy; wherein federated incremental learning securely maintains data privacy and reduces communication costs while achieving continuous, distributed malicious node detection model improvement, and wherein decision results from the decision tree (DT) classifier at the first-stage detection are further combined with predictions from the CNN-RF model at the second-stage detection through: employing ensemble stacking using a meta-classifier neural network at the server configured to receive outputs from both first-stage DT classifier and second-stage CNN-RF model; wherein the meta-classifier adaptively assigns weighting factors to individual stage decisions based on their historical reliability and prediction accuracy, thus integrating both stage predictions into a final consolidated decision to further reduce false alarms and improve precision in detecting malicious nodes.

In an embodiment, the system architecture incorporates a federated incremental learning strategy implemented at the server level to address privacy preservation, communication efficiency, and continuous model improvement across distributed wireless sensor networks. Rather than requiring the transmission of raw sensor or network data to a central server—which could expose sensitive operational patterns and incur high communication costs—the federated learning mechanism allows each cluster head (CH) to locally train its own instance of a CNN-RF (Convolutional Neural Network-Random Forest) model. These localized models learn from the data collected within their respective clusters, capturing unique behavioral and environmental patterns pertinent to specific network segments. The CHs periodically transmit their updated model parameters (e.g., convolutional kernel weights, forest split criteria) rather than raw data to the central server. The server aggregates these parameters using techniques such as Federated Averaging or weighted gradient summation, producing a globally optimized CNN-RF model that integrates insights from diverse local environments while maintaining data privacy.

Once the global model is updated, it is redistributed back to the individual CHs, replacing or refining their local models. This cyclical process enables continuous learning, allowing the detection system to adapt to evolving malicious behavior patterns across the entire network. Importantly, the use of federated incremental learning ensures that model improvement is achieved in a distributed and privacy-preserving manner while significantly reducing the communication overhead associated with traditional centralized learning paradigms. This enables large-scale deployment in bandwidth-constrained environments and enhances the responsiveness of the system to localized attacks without sacrificing global learning coherence.

In addition to decentralized model training, the system further improves its detection robustness by integrating the outputs of both first-stage and second-stage detection modules through ensemble stacking. Specifically, the decision outcomes from the decision tree (DT) classifier used in the CH-level hybrid machine learning model (first stage) and the CNN-RF model used at the server level (second stage) are combined using a meta-classifier neural network. This neural network, deployed at the server, is trained to receive the probabilistic outputs or class scores from both classifiers as input features and produce a final consolidated decision on whether a node is malicious or benign. The meta-classifier continuously learns from feedback data and adjusts the weighting it assigns to each input model based on historical performance metrics, such as precision, recall, and overall classification accuracy.

For instance, if the first-stage DT classifier demonstrates high reliability in detecting certain types of network layer attacks but lower performance on stealthy application-layer anomalies, the meta-classifier learns to increase the weighting of CNN-RF outputs in those scenarios. Conversely, if the CNN-RF model underperforms in detecting real-time anomalies due to data latency but the DT classifier detects them accurately, the meta-classifier compensates by boosting the DT's influence in the final decision. This adaptive weighting not only integrates the complementary strengths of each stage but also dynamically evolves with the system's operational context.

This embodiment ensures technical efficacy by combining the scalability and privacy advantages of federated learning with the accuracy and adaptability benefits of ensemble decision fusion. Together, these components allow the system to detect malicious nodes more precisely, reduce false alarms, and continuously adapt to changing threat landscapes, thereby enabling a fully supportive and robust realization of the claimed invention.

In an embodiment, the ranking unit further comprises: performing predictive feature importance analysis by employing an explainable artificial intelligence (XAI) technique, wherein SHapley Additive explanations (SHAP) values quantify contributions of each feature to the detection outcome; continuously recalibrating and optimizing feature selection based on SHAP value rankings to highlight critical metrics actively contributing to malicious node identification; wherein said XAI-based recalibration enhances transparency and interpretability, facilitating systematic refinement of selected metrics during network runtime, and wherein the server is further configured to: perform temporal drift detection by analyzing historical detection outcomes to identify changes in node behavior distributions indicative of emerging malicious patterns, wherein upon detection of a drift exceeding a predetermined threshold, an automatic retraining trigger activates an incremental model updating process utilizing recent data, wherein said drift detection and incremental model updating proactively adapt the second-stage ML-DL detection model to evolving threat behaviors, significantly improving responsiveness to previously unknown malicious activities, wherein the at least one CH is further configured to: implement a proactive resource allocation strategy that dynamically redistributes computational tasks and detection workloads among neighboring CHs based on real-time assessments of each CH's resource metrics, wherein the resource allocation decision employs a weighted multi-objective optimization algorithm considering CH battery status, CPU load, bandwidth availability, and connectivity strength.

In an embodiment, the system is further equipped with an advanced ranking unit that integrates explainable artificial intelligence (XAI) techniques to improve transparency, adaptability, and performance of malicious node detection. Specifically, the ranking unit employs SHapley Additive explanations (SHAP) values to compute the predictive importance of each node and network metric with respect to the outcome of the detection models. SHAP values, grounded in cooperative game theory, attribute a unique importance score to each feature by considering its marginal contribution across all possible feature combinations. This allows the system to identify which metrics—such as packet delivery ratio, node uptime variance, energy consumption, or signal fluctuation—are most influential in driving detection decisions. By continuously recalculating SHAP values in runtime using the most recent data and model outputs, the system dynamically recalibrates its feature selection strategy. Less influential or redundant features are deprioritized while critical ones are emphasized, enhancing the overall accuracy, reducing model complexity, and improving interpretability.

This SHAP-based feature importance mechanism not only allows the system to focus on the most relevant behavioral indicators but also provides human operators and administrators with actionable insights into why specific nodes are being flagged, thereby fulfilling a key requirement of transparency in AI-driven security systems. For example, if a node is repeatedly identified as malicious, SHAP analysis might reveal that a sudden spike in energy usage and abnormal message timing were the main contributing factors, enabling more informed decision-making or manual intervention if needed.

Concurrently, the server incorporates a temporal drift detection mechanism that continuously monitors the distribution of node behaviors and detection outcomes over time. This drift detection process is designed to identify shifts in the underlying data distributions, which may indicate the emergence of new types of attacks or changes in normal operational patterns. The system compares recent detection data with historical baselines using statistical distance measures such as Kullback-Leibler divergence or population stability index. If the observed drift exceeds a preconfigured threshold, the server automatically initiates an incremental retraining procedure. This involves selectively retraining the second-stage ML-DL model (e.g., CNN-RF) using recent data samples while retaining previously learned parameters to avoid catastrophic forgetting. By doing so, the system proactively updates itself in response to evolving threats, ensuring sustained accuracy and resilience without requiring full model reinitialization.

Additionally, the cluster heads (CHs) are further augmented with a proactive resource allocation strategy aimed at optimizing the utilization of network resources while maintaining real-time detection capabilities. Each CH continuously monitors its operational metrics such as residual battery life, CPU load, communication bandwidth, and node connectivity strength. These metrics are fed into a weighted multi-objective optimization algorithm that determines how to redistribute computational tasks—including anomaly detection, data summarization, and local model updates—among neighboring CHs. For instance, if one CH is experiencing high CPU usage and reduced battery life, while a neighboring CH has available resources and strong connectivity, the system offloads certain processing tasks accordingly. This dynamic load balancing reduces latency, avoids node overloading, and prolongs the operational life of the WSN as a whole.

Together, the integration of SHAP-based XAI for adaptive feature ranking, temporal drift detection with automatic model retraining, and intelligent resource management across CHs ensures the technical completeness and scalability of the system. These mechanisms collectively improve detection accuracy, system responsiveness to novel threats, and operational efficiency, while maintaining transparency and robustness—thereby fully enabling and supporting the scope and claims of the invention in practical, real-world WSN deployments.

In an embodiment, dynamic threshold detection and the hybrid ML technique at the CH further comprise: incorporating real-time node context-awareness through monitoring spatial correlation metrics computed based on signal propagation characteristics and distances between sensor nodes, wherein thresholds for node behavior are dynamically adjusted by accounting for expected variations due to environmental and physical changes affecting signal quality and network topology, wherein contextual spatial awareness significantly reduces false positives caused by temporary environmental interference or legitimate network topology variations, and wherein the data acquisition unit is further configured to: employ adaptive data sampling intervals wherein sampling frequency of node and network metrics is automatically increased upon detecting suspicious node behaviors or threshold violations and reduced during normal operations, wherein adaptive sampling intervals are determined using reinforcement learning agents deployed at the CH that optimize sampling frequency based on reward functions designed to balance detection accuracy against resource utilization and communication overhead.

In an embodiment, the system's dynamic threshold detection and the hybrid machine learning (ML) technique implemented at the cluster head (CH) are further enhanced with real-time node context-awareness, enabling more intelligent and adaptive decision-making in the face of environmental variability and network dynamics. Specifically, the CH monitors spatial correlation metrics that are computed using signal propagation characteristics, such as received signal strength indicator (RSSI), link quality indicator (LQI), and distance estimates between neighboring sensor nodes. These metrics provide contextual information about the physical and topological relationships among nodes. For example, signal attenuation or temporary communication loss may occur due to environmental factors like rain, foliage, or obstacles, without necessarily indicating malicious behavior. By incorporating this spatial correlation into its dynamic thresholding mechanism, the CH can intelligently adjust the thresholds used to classify node behavior, reducing the likelihood of false positives that might otherwise be triggered by benign environmental changes.

The spatially aware threshold adjustment mechanism accounts for localized signal quality variations and distinguishes between legitimate behavior fluctuations and suspicious anomalies. For instance, if a group of geographically close nodes experiences a simultaneous drop in signal strength due to weather interference, the system can recognize this pattern as a correlated, environmentally induced variation rather than isolated malicious behavior. Thresholds for packet delivery ratio, transmission delay, or energy usage are then temporarily relaxed within that region, avoiding false alarms. Conversely, if a single node deviates significantly from the spatial norm despite similar environmental conditions among its neighbors, it becomes a more likely candidate for anomaly detection.

Furthermore, the data acquisition unit at each CH is equipped with an adaptive sampling mechanism that dynamically adjusts the frequency at which node and network metrics are collected based on real-time operational states. This sampling interval is not fixed but rather governed by reinforcement learning agents embedded at the CH level. These agents continuously monitor the detection context and learn an optimal sampling strategy using reward functions that balance the competing objectives of detection accuracy, energy efficiency, and communication bandwidth. When anomalous behavior or threshold violations are observed—such as unusual packet loss patterns, irregular heartbeat messages, or inconsistencies in node trust scores—the agent increases the sampling frequency to capture more granular data and improve the accuracy of detection models. During periods of stable, benign activity, the agent reduces the sampling rate to conserve resources, minimize network congestion, and extend node lifetime.

The reinforcement learning agent, trained using algorithms such as Q-learning or Deep Q-Networks (DQNs), receives positive rewards for configurations that lead to timely and accurate detections with minimal energy and bandwidth consumption. Over time, the agent converges on an efficient and context-sensitive sampling policy that adapts to changing network and threat conditions. For example, in high-traffic or high-risk zones, the system may operate at higher granularity, whereas in low-risk or stable areas, data collection becomes more sparse.

In an embodiment, the CH further comprises: an anomaly caching mechanism configured to temporarily store initial anomaly detection events flagged by dynamic threshold detection before transmission to the server, wherein cached anomalies undergo temporal correlation analysis using short-time statistical methods, including moving-window variance and mean-shift clustering, to reduce redundant transmissions by identifying and merging related events, wherein said anomaly caching and correlation analysis reduces communication bandwidth consumption and prevents redundant alerts, significantly optimizing data transmission efficiency.

In an embodiment, the cluster head (CH) is further enhanced with an anomaly caching mechanism designed to optimize data transmission efficiency by intelligently managing the flow of anomaly alerts from the CH to the server. This mechanism temporarily stores initial anomaly detection events that are flagged through the CH's dynamic threshold detection processes. Rather than immediately forwarding each detected anomaly to the server—an approach that could flood the network with redundant or correlated alerts—the anomaly caching module allows the system to collect, analyze, and prioritize alert information locally before initiating upstream communication.

Within the caching window, the CH performs temporal correlation analysis on the stored anomalies using short-time statistical methods, such as moving-window variance analysis and mean-shift clustering. Moving-window variance is employed to examine the variability of specific node or network metrics over a rolling time window (e.g., the past 10-20 seconds), helping to identify consistent patterns in anomalies that are statistically significant rather than momentary fluctuations. For instance, repeated spikes in packet delay or energy depletion within a short interval can be aggregated into a single composite anomaly if their temporal proximity and similarity exceed predefined thresholds. Simultaneously, mean-shift clustering is used to group similar anomaly events based on feature space proximity, allowing the CH to identify overlapping or closely related detection outputs—such as multiple packet drop alerts from a single node or nearby nodes—and merge them into a consolidated event.

This layered correlation and clustering analysis reduces redundant alerts by eliminating repetition and grouping semantically or temporally similar events. For example, if three consecutive anomalies from a node indicate a gradual signal degradation due to environmental interference, the caching mechanism may consolidate them into a single anomaly report that more accurately reflects the overall event rather than spamming the server with separate transmissions. In turn, this significantly decreases communication bandwidth consumption, a critical factor in wireless sensor networks where energy and bandwidth resources are limited.

Moreover, the anomaly caching mechanism is designed with adaptive logic, such that the caching duration and thresholds for clustering can be tuned dynamically based on current network load, node density, and historical anomaly rates. During high-alert conditions, the system can shorten the caching interval to maintain responsiveness, while in more stable periods, it can increase the window to prioritize efficiency.

By locally performing intelligent filtering, merging, and prioritization of anomaly alerts, the CH reduces unnecessary network traffic and prevents the server from being overwhelmed by redundant or low-priority events. This design not only improves the scalability and responsiveness of the overall system but also ensures that only the most relevant, temporally correlated anomalies are escalated for further analysis and action. The embodiment, therefore, supports the claimed functionality by enhancing the technical efficacy of anomaly transmission processes and enabling a more resource-aware, high-fidelity malicious node detection system.

In an embodiment, the second-stage CNN-RF detection process is further enhanced by: integrating an attention mechanism within CNN layers that dynamically assigns higher weights to features exhibiting significant variations between benign and malicious node behaviors, wherein said attention mechanism leverages a self-attention matrix derived from historical detection outcomes to continuously refine feature emphasis, improving feature representation accuracy and detection sensitivity, thus enabling rapid identification and classification of subtle malicious patterns, and wherein the hybrid ML technique at the CH further comprises: executing online hyperparameter tuning utilizing Bayesian optimization algorithms periodically to optimize decision-tree parameters, including tree depth, minimum samples per split, and split criteria, wherein Bayesian optimization proactively updates hyperparameters by modeling relationships between hyperparameter choices and detection accuracy outcomes obtained from recent detection events, wherein the ranking unit is further configured to: perform unsupervised anomaly detection on feature sets through Isolation Forest algorithms during idle network periods, detecting previously unclassified anomalous patterns within node and network metrics, wherein detected anomalies identified by Isolation Forests trigger supplementary supervised labeling and inclusion into training datasets, incrementally expanding labeled anomaly data and continuously refining the accuracy of ML-DL detection models.

In an embodiment, the second-stage Convolutional Neural Network-Random Forest (CNN-RF) detection process is further enhanced by the integration of an attention mechanism directly within the convolutional layers. This attention mechanism functions by dynamically assigning higher weights to specific input features that exhibit statistically significant variations between benign and malicious node behaviors. During convolutional feature extraction, the network computes a self-attention matrix that captures the internal correlations and relative importance of each feature across temporal sequences and network conditions. The attention scores are derived from historical detection outcomes, allowing the model to prioritize features such as abrupt changes in signal strength, abnormal packet delays, or energy consumption trends that have been empirically linked to prior malicious behavior. By continuously refining the feature emphasis through this learned self-attention mechanism, the CNN improves its feature representation accuracy, thereby enhancing its ability to detect subtle, non-obvious malicious patterns that may otherwise evade conventional filters. This mechanism is particularly effective in identifying low-and-slow attacks or adaptive threat behaviors that gradually shift away from known profiles.

Parallel to the deep learning enhancement at the server level, the hybrid machine learning technique at the cluster head (CH) incorporates a mechanism for online hyperparameter tuning of the decision tree (DT) classifier, which forms the core of the CH-level first-stage detection. This tuning is executed using Bayesian optimization algorithms, which model the relationship between various DT hyperparameters—such as tree depth, minimum samples per split, and split criteria—and the classifier's detection performance. Unlike grid or random search methods, Bayesian optimization uses prior performance data to probabilistically estimate the best parameter configurations, significantly improving convergence efficiency. These tuning operations are scheduled periodically, often during low-activity windows or after detection drift, and are informed by recent detection events to ensure the DT remains well-calibrated to current network conditions. For example, if false positives rise due to overfitting of shallow decision trees, Bayesian optimization may suggest increasing tree depth or adjusting the impurity measure to better separate complex decision boundaries.

Additionally, the ranking unit is further configured to perform unsupervised anomaly detection using Isolation Forest algorithms during idle network periods. The Isolation Forest operates by randomly partitioning feature space and identifying samples that are isolated in fewer splits—typically indicative of anomalies. By applying this method on node and network metric datasets, the system can detect previously unclassified or emerging anomalous behaviors that may not have been part of the original training data. Once such anomalies are detected, they are flagged for supplementary supervised labeling either by human analysts or via cross-validation with other detection modules. These labeled instances are then incrementally integrated into the training dataset, contributing to the continuous refinement of both machine learning and deep learning detection models across CH and server levels.

In an embodiment, the evaluation related to node trust is further performed by: integrating behavior trajectory modeling that records sequential metric changes of nodes to generate temporal profiles indicative of typical versus suspicious node operations, wherein Hidden Markov Models (HMMs) analyze these sequential behavioral trajectories to identify state transitions characteristic of compromised or potentially malicious sensor nodes, and wherein the server is further configured to: utilize multi-agent reinforcement learning wherein agents deployed at CH-level interact collaboratively by exchanging detection policy outcomes via lightweight communication protocols, wherein each CH agent locally updates policies based on global reward signals shared from the server reflecting overall network-level detection effectiveness and resource efficiency, thus enabling collective improvement of detection strategies across the distributed network nodes through decentralized collaborative learning.

In an embodiment, the evaluation of node trust within the wireless sensor network (WSN) is significantly enhanced through the integration of behavior trajectory modeling, which captures and analyzes sequential changes in node-specific metrics over time to differentiate between typical and anomalous behavioral patterns. This modeling involves the continuous logging of metrics such as packet transmission rates, energy usage, signal quality, and communication frequency, thereby forming temporal profiles that encapsulate the operational behavior of each sensor node. To analyze these behavior sequences, the system utilizes Hidden Markov Models (HMMs), which are particularly well-suited for modeling systems that transition through a series of hidden (unobservable) states based on observable emissions—in this case, the measured node metrics. The HMM is trained to recognize common state transitions associated with normal operations, such as periodic communication cycles or expected variations due to battery depletion. When a node begins to exhibit transitions that deviate from this learned pattern—such as sudden spikes in activity, irregular silence, or erratic metric fluctuations—the HMM assigns a higher probability to anomalous states, flagging the node as potentially compromised or malicious.

This behavior trajectory modeling provides a probabilistic framework that not only identifies immediate anomalies but also uncovers more nuanced or evolving threats that may develop gradually, such as compromised nodes attempting to blend into normal network activity before launching an attack. For instance, a node that normally transmits data every 10 minutes might reduce its activity to avoid detection or begin injecting false data at non-periodic intervals. The HMM would detect such deviations as statistically unlikely transitions, contributing to a dynamic reduction in the trust score assigned to that node.

To complement this individualized node evaluation, the system incorporates a decentralized intelligence-sharing framework using multi-agent reinforcement learning (MARL). In this configuration, each cluster head (CH) hosts an autonomous detection agent that learns policies for managing local detection tasks—such as anomaly classification, resource allocation, and sampling frequency optimization. These CH agents operate under a reinforcement learning framework, where actions (e.g., updating detection thresholds, reassigning trust scores, initiating deeper analysis) are rewarded based on how effectively they improve detection accuracy and maintain resource efficiency.

Crucially, these agents do not learn in isolation. They communicate with one another using lightweight, low-bandwidth protocols to exchange summaries of their detection experiences and current policies. The server oversees this process by aggregating detection feedback from all CHs and computing global reward signals that reflect the overall detection efficacy and network health. These global signals are then distributed back to the CH agents, allowing each one to update its local learning model in light of collective performance insights. For example, if a CH agent learns that a particular behavioral pattern is indicative of malicious activity based on confirmed detections in neighboring clusters, it can preemptively adjust its own detection policies even before experiencing a similar pattern locally.

This cooperative learning structure enables decentralized, scalable, and resilient adaptation of detection strategies across the network. As a result, the system becomes capable of continuously evolving its defense posture without relying solely on centralized updates, improving responsiveness to emerging threats and reducing single points of failure. This embodiment supports and enables the core claims of the invention by combining temporal pattern analysis with collaborative policy optimization to detect and respond to malicious node behaviors with greater efficiency, intelligence, and scalability in complex WSN environments.

FIG. 2 illustrates a flow chart of a method for detecting malicious nodes in a wireless sensor network (WSN) in accordance with an embodiment of the present disclosure. At step (202), method (200) includes calculating, by at least one cluster head (CH) in the WSN, a resource weight based on at least one resource metric of the CH, wherein the at least one resource metric of the CH comprises at least one of: resource utilization at the CH (RUCH), battery level of the CH (BtCH), connectivity status (Cst) representing the number of sensor nodes associated with the CH, and signal-to-noise ratio (SNR).

At step (204), method (200) includes performing, by the at least one CH, a first-stage malicious node detection based on the calculated resource weight by applying dynamic threshold detection to sensor data received at the CH and utilizing a hybrid machine learning (ML) technique to analyze the sensor data and the dynamic thresholds at the CH level, wherein the thresholds are dynamically adjusted based on the calculated resource weight.

At step (206), method (200) includes performing, by a server communicatively coupled with the at least one CH, a second-stage malicious node detection based on results from the first-stage malicious node detection, wherein the second-stage malicious node detection utilizes a combination of machine learning (ML) and deep learning (DL) techniques for enhanced detection accuracy.

At step (208), method (200) includes updating at least one threshold parameter used in the first-stage malicious node detection based on results from the second-stage malicious node detection.

In another embodiment, the hybrid ML technique utilized in the first-stage malicious node detection comprises a decision tree (DT) classification method, wherein the dynamic threshold detection in the first-stage malicious node detection is applied to a subset of features selected from a feature set comprising individual node metrics and network-wide metrics, to optimize resource utilization at the CH level, wherein the feature set comprises at least one of: packet rate, packet drop rate, packet duplication rate, signal strength, signal-to-noise ratio (SNR), data throughput, energy consumption rate, number of neighbors, route request frequency, route reply frequency, data transmission frequency, data reception frequency, error rate, CPU usage, memory usage, and bandwidth usage, wherein the combination of ML and DL techniques utilized in the second-stage malicious node detection at the server level comprises a hybrid Convolutional Neural Network and Random Forest (CNN-RF) model.

Figure 3:
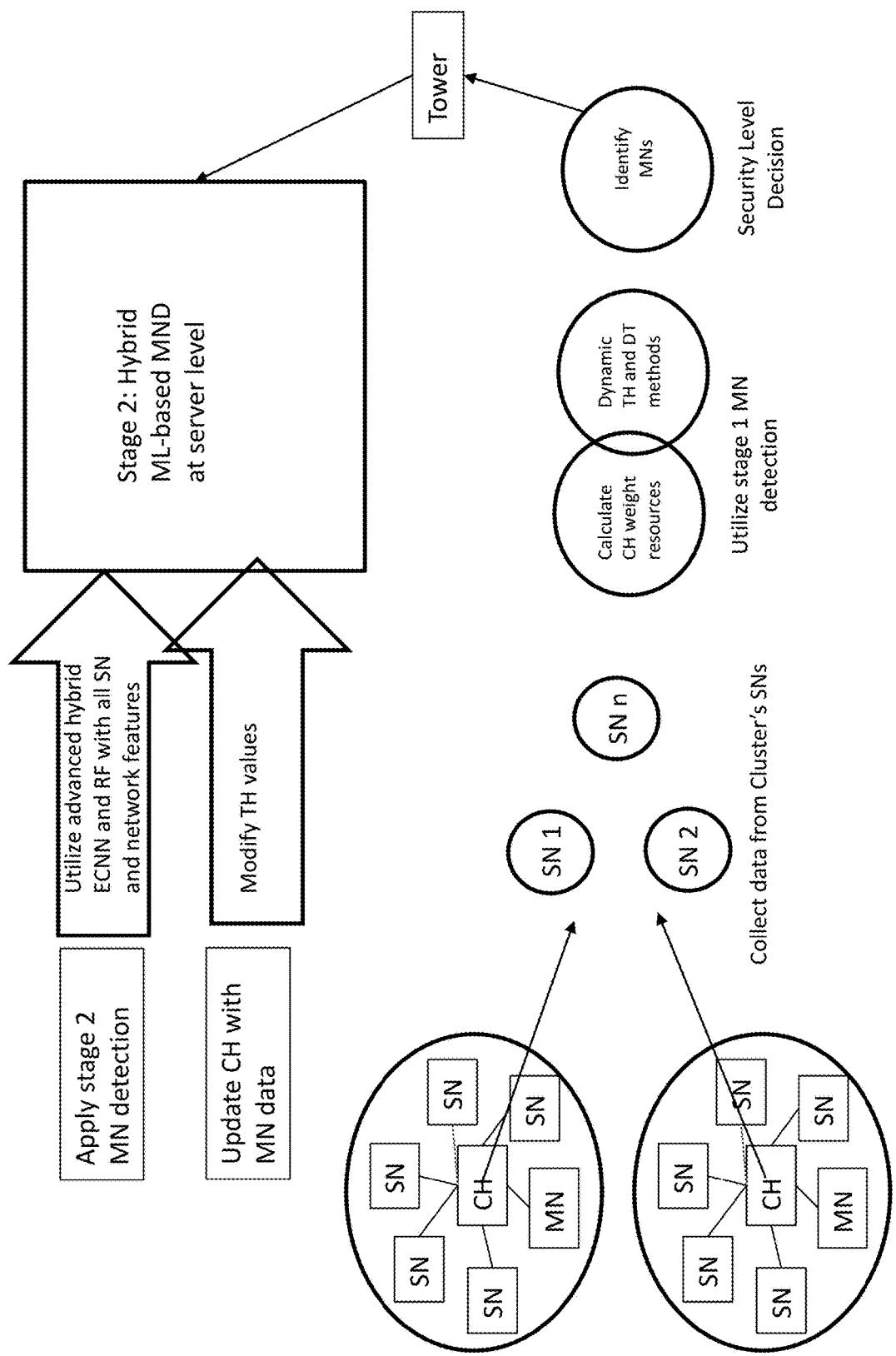
FIG. 3 illustrates a workflow processes of the proposed DSMND Stages for MN Detection in WSN in accordance with an embodiment of the present disclosure.

FIG. 3 illustrates a workflow processes of the proposed DSMND Stages for MN Detection in WSN in accordance with an embodiment of the present disclosure. To enhance network security, a static setup with n sensor nodes $\{SN_1, SN_2, \ldots, SN_n\}$ distributed randomly across the monitored area is visualized. These nodes communicate within a shared transmission range, with each connecting to a single CH to ensure continuous network connectivity. The disclosed invention efforts concentrate on optimizing the detection of potential MNs while minimizing the operational load on the CHs. To tackle the resource strain and computational demands posed by DL methods in resource-constrained WSNs, the DSMND scheme is developed to effectively mitigate these challenges. While DL techniques excel at identifying characteristics of MNs and enhancing detection accuracy, their resource-intensive nature can impede real-time processing. The DSMND scheme addresses this by utilizing a dual-stage detection process, which optimizes resource use during the initial detection phase while leveraging the precision of ML techniques in subsequent analyses. At the CH level, a hybrid ML technique is employed to manage resource constraints and reduce computational load. This approach minimizes communication sessions and data requests, facilitating efficient and early detection of potential threats. On the server side, a combination of ML and DL methodologies is utilized for enhanced accuracy in detection. Although this stage is more resource-intensive, it improves detection precision while avoiding excessive burden on the network.

In this section, the invention begin by exploring the different nodes and network features utilized in the dataset. Subsequently, the architectural aspects of the proposed DSMND scheme for WSN are discussed. This encompasses the CH resource weighting method and hybrid ML techniques implemented in the initial CH-level stage. To achieve efficient resource utilization during early detection, the DSMND scheme incorporates several steps. First, lightweight feature selection techniques are applied at the CH level to reduce the amount of data that needs to be processed. This is followed by using less complex ML techniques that require fewer computational resources but are still effective in identifying potential MNs. Additionally, the CHs are configured to minimize communication overhead by aggregating data before transmitting it to the server. For example, instead of sending raw sensor readings, the CHs can send summaries or anomalies detected in the data. Furthermore, power management strategies are implemented to ensure that the sensors and CHs operate within their energy constraints, prolonging network lifetime. Next, the integration of a hybrid ML approach is explored in the second stage, which occurred on the server side.

Figure 4:
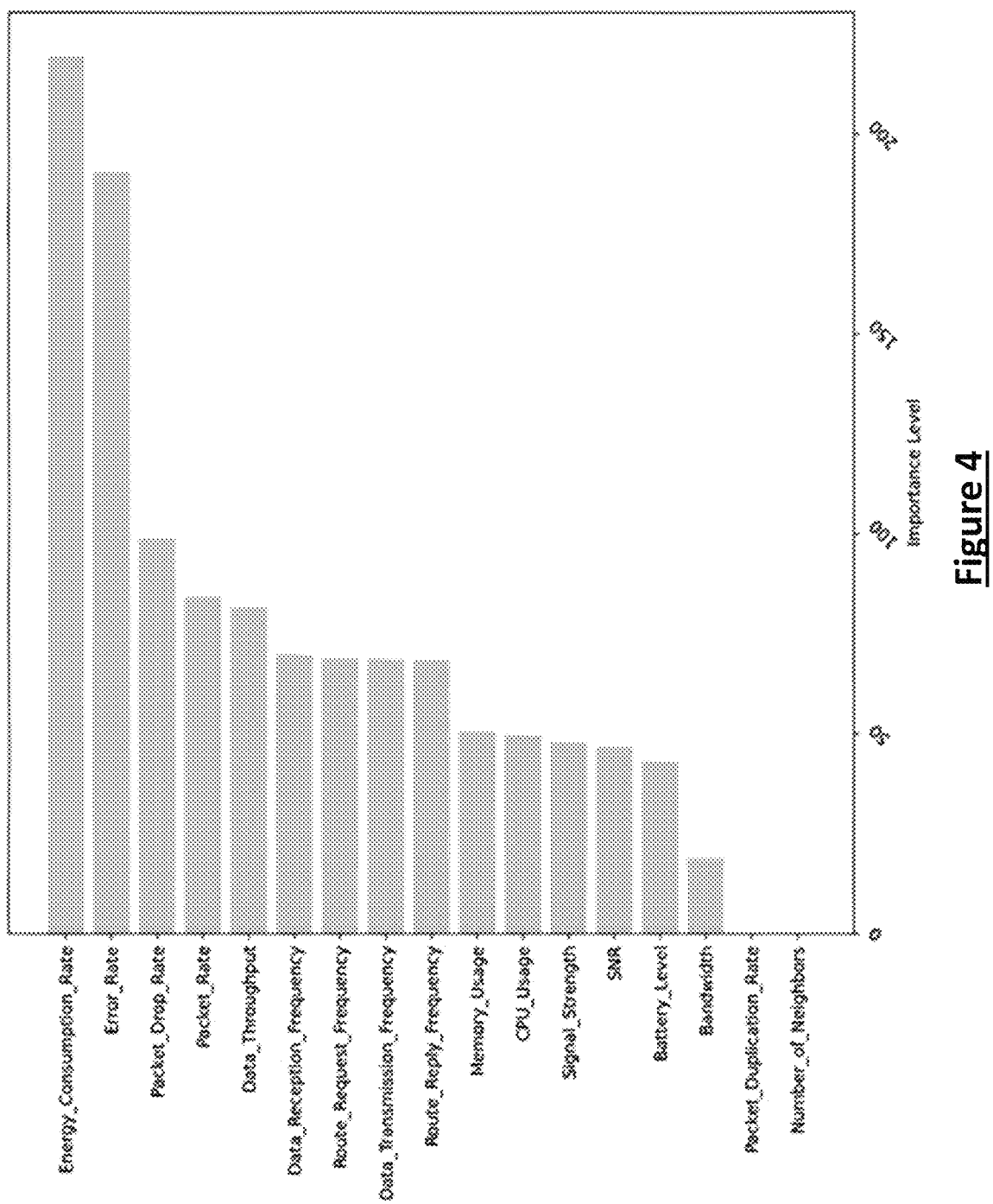
FIG. 4 illustrates the importance Levels of Nodes and Network Features Present in the Dataset and Employed in accordance with an embodiment of the present disclosure.

FIG. 4 illustrates the importance Levels of Nodes and Network Features Present in the Dataset and Employed in accordance with an embodiment of the present disclosure.
Exploring Node and Network Features within the Dataset Nodes and network features play a pivotal role in identifying potential MNs within WSN. This disclosure utilizes the SensorNetGuard dataset, which includes a wide range of features essential for MN detection, categorized into individual nodes and network-wide metrics. Individual node metrics include factors such as the packet rate, which reflects the packet transmission frequency of the node and is indicative of abnormal behavior when excessively high or low. The packet drop and packet duplication rates serve as potential indicators of tampering or system malfunction, signaling a compromised node. Features such as signal strength and signal-to-noise ratio (SNR) are selected for their ability to provide insights into transmission quality. Consistent irregularities in these metrics can indicate intentional interference or signal jamming by malicious entities.

Network-wide metrics encompass features such as data throughput, which reflect the overall network performance and are susceptible to attacks such as denial-of-service (DOS). Monitoring data throughput helps in identifying when network performance is degraded due to malicious activities. In battery-powered nodes, monitoring the energy consumption rate is critical because excessive usage may signal that a node is being used maliciously or is compromised. The number of neighbors is another vital metric; it helps detect isolated nodes or artificial clustering which could be orchestrated by attackers to create vulnerabilities or disrupt network operations. Additionally, features such as route request and route reply frequencies are chosen to identify routing anomalies. MNs often attempt to disrupt routing protocols or eavesdrop on network traffic, making these features essential for detecting such behavior. Similarly, analyzing the data transmission and reception frequencies is important as patterns in these metrics can reveal manipulation by MNs, such as attempts to intercept data or cause network congestion.

In this disclosure, additional features has been also focused that provide deeper insights into node behavior and health. The error rate, CPU usage, and memory usage are key metrics that help assess a node's operational stability and performance. High error rates can signal communication issues or interference, while abnormal CPU and memory usage may indicate that a node is being used for unauthorized purposes or experiencing malware infections. Moreover, monitoring bandwidth usage for deviations from typical patterns can highlight nodes engaged in data exfiltration or participating in network attacks. These features are vital for a comprehensive evaluation of node integrity and for detecting subtle anomalies that might be indicative of malicious activity. By integrating these features into our analysis, the invention enhance our ability to identify and mitigate potential security threats effectively. To provide a comprehensive overview of the features used in this disclosure, Table in FIG. 13 presents the features listed along with their value ranges and data types. FIG. 4 delineates the node and network features, ranking them according to their chi-squared statistics, which measure their independence from the target variable "Is_Malicious." Higher statistical values signify a stronger relationship with the target variable, indicating heightened significance in identifying potential security risks originating from an MN.

Cluster Head-Level Malicious Node Detection Stage

The initial MN detection stage commences with the CH collecting data from the associated SNs. During this stage, the CH assesses its available resources by computing the weights derived from the key resource metrics. This weight dynamically adjusts the features and their threshold values within an ML-based detection method, considering the incoming data. This technique was designed to incorporate a poweraware ML-based detection system tailored to identify MNs within clusters. The resource weight of the CH undergoes continuous recalculation, facilitating real-time adjustment of dynamic thresholds in response to incoming data, ensuring a balance between efficiency and resource optimization.

Upon detecting a breach within these thresholds, the second MN detection stage is initiated, involving a more comprehensive detection analysis on the server side. This server-side analysis is resource-intensive and focuses primarily on improving detection accuracy rather than being primarily concerned with energy consumption. The results obtained from this analysis are subsequently used to update the minimum threshold requirements for future ML detection. The following subsections detail how CH resource weights are computed and how Dynamic TH-DT methods are integrated for efficient and resource optimized MN detection.

Cluster Head Resource Weight Calculation Technique

An efficient CH-level resource management system is essential for energy conservation. Prioritizing power-aware MN detection across various CH power levels enhances security and optimizes operations while conserving energy. Resource metrics at the CH level aid in determining the involvement of the CH in the MN detection process. Efficient resource allocation among the CHs during the ML detection process prevents energy depletion and potential bottlenecks, thereby ensuring sustained responsiveness and node/network longevity.

Adapting to varying energy levels among the CHs involves fine-tuning the available resources to sustain the CH energy. The following resource metrics were used to enable continuous calculation of the weight, allowing adaptability to changing power levels:

1. Resource utilization at CH (RUCH): This metric continuously monitors critical resource consumption, including CPU, memory, and storage at the CH. Its primary function is to ensure that these resources are optimally managed and prevent overburdening, which can negatively affect data processing and network performance. Efficient resource management is essential for maintaining node responsiveness and overall network efficiency, particularly when addressing the varying CH power levels and evolving quality of service (QOS) requirements. This proactive approach to resource management helps conserve energy, reduce delays, and facilitate efficient network operations.

2. The battery level of CH ($Bt_{CH}$) plays a pivotal role in network sustainability. The excessive use of energy-intensive methods can accelerate node depletion, resulting in a decreased overall network lifetime. Maintaining effective battery management, which includes the continuous monitoring of CH battery levels and the implementation of energy-efficient decisions, is crucial for mitigating these risks and ensuring the long-term reliability of the network.

3. The connectivity status ($C_{st}$) comprises the number of SNs associated with a CH. Changes in the number of associated SNs or alterations in their connectivity status can affect both the CH's and the overall QoS of the network. These fluctuations may affect the data transmission reliability, responsiveness of the CH and network, and the efficiency of data aggregation.
4. The signal-to-noise ratio (SNR) measures the quality of a signal relative to background noise. In the context of CHs, the SNR significantly affects the CH QoS. Higher SNR levels lead to clearer and more reliable data, enhancing communication with SNs and ensuring timely data reception. Conversely, a lower SNR results in weaker, error-prone signals, increased data retransmission, and degraded node and network efficiencies. By considering the SNR as a weighted metric, the CHs can enhance data reliability and network performance through informed decisions, including threshold adjustments.

To evaluate the existing resources of the CH, a resource weight parameter is calculated, denoted as $\varphi r$, which incorporates the essential resource metrics at the CH level. This $\varphi r$ is periodically updated to adapt to the changing state of the CH and network, considering the updated values of resource metrics. The calculation of $\varphi r$ involves dividing the sum of the computed metrics by the maximum weight ($\varphi r_{max}$), which represents the weight derived from the optimal state of the resource metrics. The method outlines the steps involved in calculating the updated $\varphi r$ for each CH, which is custom-designed to adjust the threshold values of the ML process.

Dynamic Threshold Detection and Decision Tree Model

Each SN possesses a comprehensive set of features that are crucial for understanding its behavior and interactions within the network. During the initial ML stage, a deliberate subset of these features was selected for preliminary identification of potential MNs. Nodes are assigned trust values (T) to evaluate SN reliability, which are updated during the analysis in the second detection stage, encompassing the entire feature set on the server side. The decision on feature selection for initial ML detection and CH progression relies on the calculated T value.

Expanding features in ML significantly increases the computational complexity, intensifying the computations for analysis and pattern recognition. This leads to an increased workload, heightened power consumption, extended processing times, and the straining of resources within the CH. Addressing these challenges requires meticulous resource allocation and optimization strategies.

The initial MN detection stage at the CH level employs a hybrid method that combines ML-based dynamic threshold detection with DT classification to enhance accuracy. ML-based threshold detection methods establish specific thresholds within a system to identify potential malicious activities. Its architecture involves a thresholding mechanism connected to nodes and continuously changing data features composed of components that define threshold values.

The effectiveness of dynamic thresholding lies in its precise calibration and adaptability, which are tailored to the system requirements and data features. It automatically adjusts to changing data patterns or environmental conditions, thereby providing a flexible approach for detecting malicious activities. Unlike static thresholds, dynamic thresholds continuously evolve through real-time data analysis. This adaptability enables systems to respond to fluctuations in data features, environmental dynamics, or system behavior without redundancy. Through the analysis of data trends or patterns, dynamic thresholding ensures the highly responsive and accurate detection of malicious activities. This capability is particularly beneficial for applications requiring real-time adaptability and sensitivity to changing conditions.

The DT method was selected as the key ML technique in the proposed model. Its structure, akin to flowcharts, illustrates attributes through nodes, decision rules through branches, and outcomes through leaves, enabling efficient decision-making via recursive partitioning in a treelike visual format. As a supervised learning technique, DT addresses regression and classification challenges by segmenting data based on predefined rules until specific conditions are met. These conditions encompass subsets belonging entirely to one class, known as leaf nodes, and manage impurities in leaves using strategies such as majority voting.

Moreover, in scenarios where subsets lack examples that adhere to specific rules, leaf nodes are created and labeled with the most common class from the parent set.

Notably, DTs improve MN detection accuracy and speed within a WSN. Their effectiveness in data partitioning and swift decision-making based on input features contribute significantly to promptly identifying and responding to potential threats posed by MNs within the network. Consequently, DTs serve as a robust methodology for detecting malicious activity in WSNs. The integration of dynamic threshold detection with DT methodologies robustly bolsters MN detection systems, particularly cluster-based WSNs. This collaboration harnessed the strengths of both methods, reinforcing the overall detection mechanism. DT improves MN detection accuracy and speed by efficiently categorizing data and making decisions based on input features.

Dynamic threshold detection vigilantly monitors network traffic and dynamically adjusts thresholds in real-time to mirror the network's current state. This adaptability is crucial in dynamic network environments because it allows the system to detect unusual patterns that may signal a security threat. By establishing evolving thresholds aligned with the behavior of the network, this method effectively identifies anomalies that deviate from the norm.

In response to the detected malicious activities, new features were incorporated into the detection assessment. These new features are integrated through an adaptive process that includes analysing emerging patterns of malicious activities, environmental changes, and system behaviors. For example, if a new type of attack is detected that involves unusual packet sizes, the system will incorporate 'packet size' as a new feature. Similarly, if energy consumption patterns shift due to new malicious strategies, 'energy consumption rates' may be added as a feature. This process ensures that the detection system remains responsive and effective against evolving threats by continually updating the feature set based on real-time data and expert input. Concurrently, the associated threshold values for these features also increased.

Furthermore, DTs offer a structured approach to decision-making based on various features. They excel at categorizing data into predefined classes, such as distinguishing nodes as benign or malicious. The versatility of DTs in handling both categorical and numerical data makes them exceptional tools for pattern recognition, revealing complex interactions between different nodes and network features indicative of malicious activity.

When these methods collaborate, dynamic threshold detection initially flags potential anomalies based on current network conditions. These flagged instances then undergo detailed analysis by the DT, applying its rule set to determine whether the anomaly signifies malicious behavior. This two-tiered approach conducts initial screening using dynamic thresholds, followed by a comprehensive analysis using DT. DT continuously updates new data, enabling ongoing learning and evolution. This learning capability, coupled with the adaptability of the dynamic threshold, creates a detection system capable of identifying not only known threats but also potentially new and emerging ones.

At this stage, the dynamic threshold detection method operates at the CH level, using a specific feature set. Here, the model conducts feature extraction from a dataset ($\mathfrak{D}$) comprising (n) features to derive a feature set denoted as $F=\{f_1, f_2, \ldots, f_n\}$. Subsequently, for each feature $f_i$, the model computes its respective threshold value ($\Upsilon_i$), dynamically adjusting it based on evaluations related to node trust and detected MNs. Conversely, these values decrease in the absence of the detected MNs. This continual adaptation ensures a responsive and adaptive security mechanism capable of dynamically addressing evolving threats within a WSN.

To compute the mean of the thresholds, the mean of each feature $f_i$ ($\mu$) is initially calculated using the following formula:

$$\mu = \frac{1}{n}\sum_{i=1}^{n}(f_i) \qquad (1)$$

Then, the mean threshold value $\Upsilon i$ is computed for each feature fi, as follows:

$$Y_i = \mu + f_i \times \sigma \qquad (2)$$

Here, $\sigma$ represents the standard deviation of the feature set, computed as follows:

$$\sigma = \sqrt{\frac{1}{n-1}\sum_{i=1}^{n}(f_i - \mu)^2} \qquad (3)$$

The weight value, denoted as $\omega$, for each SN is then calculated by computing the mean of the thresholds and adjusting it by a constant value $\upsilon$:

$$\omega = \mu \times \upsilon, \upsilon \neq 0 \qquad (4)$$

This $\omega$ represents an aggregate evaluation of security thresholds for each SN. Unique $\omega$ values are then assigned to SNs connected to a CH, directly influencing the calculated $\mathcal{T}$ value for each node and subsequently impacting the CH's response. Consequently, this variation introduces diverse assessment strategies during the initial ML-based detection stage across network nodes. When calculating the $\mathcal{T}$ value, both the $\omega$ value linked to a specific SN and incorporate the computed φr value is associated with the corresponding CH, as depicted by Eq. (5).

$$\mathcal{T} = \frac{\omega}{\varphi r}, \varphi r \neq 0 \qquad (5)$$

The process then evaluates the node's trust to dynamically adjust these thresholds list $\Upsilon = \{\Upsilon_1, \Upsilon_2, \ldots, \Upsilon_n\}$ based on the calculated $\mathcal{T}$ value. If the computed $\mathcal{T}$ surpasses the current $\mathcal{T}$ value ($\mathcal{T}_{current}$), thresholds undergo a decrease by a predetermined constant value $\delta$, thereby adjusting the sensitivity of. The value of $\delta$ is determined based on empirical testing and historical data analysis to ensure it effectively balances the detection sensitivity without causing false positives or negatives. Concurrently, the number of thresholds is correspondingly reduced by a constant value $\lambda$. Similarly, $\lambda$ is set through experimentation to optimize the model's performance and maintain an appropriate level of granularity in threshold assessment. Conversely, if the computed $\mathcal{T}$ falls below the $\mathcal{T}_{current}$, thresholds are increased by $\delta$ value, and n is augmented by $\lambda$ to adapt to evolving network conditions. This update subsequently recalculates the values of φr, $\mathcal{T}$, and $\omega$, ensuring continual evaluation and adaptation of SNs within the network. It begins by computing the dynamic thresholds and node trust values. Subsequently, the technique initializes a DT model tailored to identify potential MNs within the network. The trained model predicted the presence of MNs based on the acquired insights and analysis of the DT rules. When the calculated $\mathcal{T}$ value falls below a predefined threshold $\delta$ or when a potential MN is identified, the technique transitions to a new ML-based detection stage at the server. This stage triggers the integrated CNN and RF methods (Hybrid CNN-RF), enabling a comprehensive analysis of the complete features available in dataset $\mathfrak{D}$. The time complexity of technique 3 is O (n log n) for training the DT and O(log n) for prediction. The time complexity of technique 3 is O(n log n) for training the DT and O(log n) for prediction.

Hybrid CNN and RF-Based Malicious Node Detection

In the second stage of the server-side DSMND, activation occurs upon the CH, detecting either a low $\mathcal{T}$ rate in an SN or potential malicious activity within the node. This model integrates a hybrid CNN and RF to identify potential security threats efficiently by utilizing the features of the entire dataset. This architecture differs significantly from traditional methodologies, which are specifically tailored to handle the intricacies of WSN security.

The hybrid model integrates CNN layers, which are vital for extracting intricate patterns from a dataset. It consists of multiple layers, beginning with 64 and 32 filters each, employing a kernel size of three and rectified linear unit (ReLU) activation. These convolutional layers systematically process the input data and learn hierarchical representations of the features. Subsequently, a pooling layer with a pool size of one maximizes feature extraction while retaining essential information. The flattened output from pooling served as an input for the subsequent classification layers. This adept integration of CNN layers enables the model to discern intricate patterns within the data. When coupled with the RF classifier, this synergy facilitates accurate classification, resulting in the exceptional accuracy of the model compared to individual ML methods. By effectively leveraging CNN's feature extraction capabilities and harnessing the ensemble learning of RF, the model gains a holistic understanding of complex data structures, ultimately enhancing predictive accuracy.

Consider dataset $\mathfrak{D}$ with n features (f1, f2, ..., fn) were obtained from the network nodes. CNNs automatically transform these features into feature vectors ($\mathcal{V}$), as follows:

$$\mathcal{V} = CNN(\mathcal{D}) \quad (6)$$

The feature vectors $\mathcal{V}$ become the inputs for the RF ensemble of DTs. This process is described as follows:

$$\mathcal{P} = RF(\mathcal{V}) \quad (7)$$

Here, P signifies the classification outcome produced by the RF model after processing feature vector V derived from the CNN transformation. CNNs act as feature generators before the RF classification step. The input data are normalized in the preprocessing phase to ensure optimal handling within the system. To bolster model robustness, the dataset was stratified into five folds for a five-fold cross-validation strategy $d_1, d_2, \ldots, d_5$. Each CNN was trained and validated on a different subset $d_k$ to ensure diversity and prevent parameter redundancy.

$$CNN_k = \text{Train}(d_k), k = 1, 2, \ldots, 5 \quad (8)$$

The trained CNNs collectively contributed to the creation of the DTs within the RF framework. In this process, various features generated by CNNs from individual node characteristics and network-wide features guide decision-making in the RF. During the testing, the performance of the trained model was evaluated using the test dataset ($d_{test}$). The $d_{test}$ undergoes CNN processing, and its outputs serve as inputs to the RF for classification as follows:

$$\mathcal{P}_{test} = RF(CNN_{test}(d_{test})) \quad (9)$$

Let P CNN represent the individual CNN output of each SN in a WSN. For each node, the RF utilizes the CNN outputs to determine its status as malicious or benign. By employing a majority voting mechanism across the DTs, the RF determines the final classification outcome for a node, as follows:

$$\mathcal{P}_{final} = MajorityVote(\mathcal{P}_{CNN} \quad (10)$$

Where P final represents the final classification outcome, which is determined by aggregating the individual CNN outputs using a majority voting scheme within the RF. This multistep approach integrates training, validation, and classification to ensure a thorough evaluation of potential threats within the WSN. This methodology differs significantly from conventional approaches by conducting validations at multiple stages, thereby enhancing the accuracy and reliability of identifying malicious or benign nodes within a network.

Figure 5:
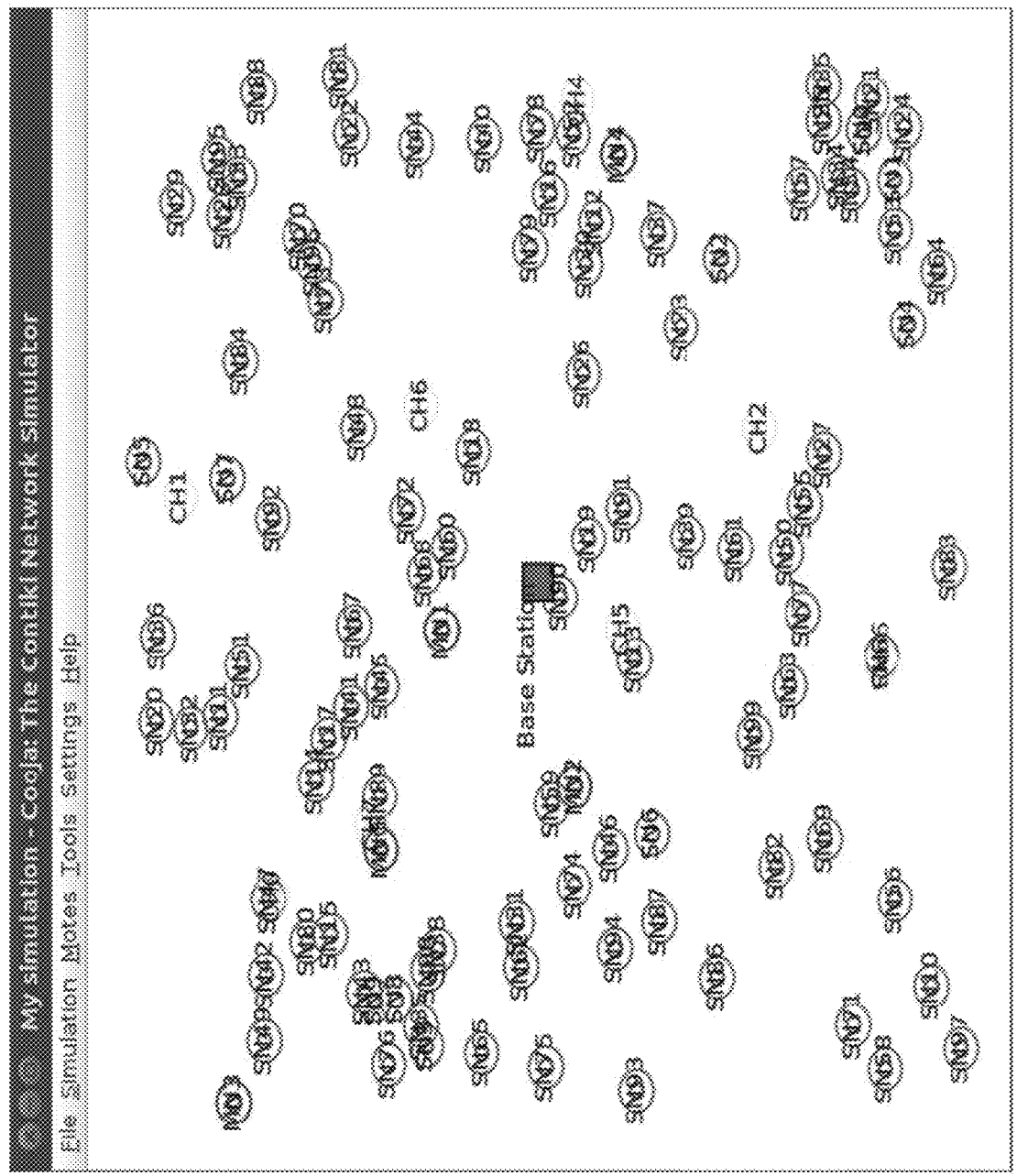
FIG. 5 illustrates Simulated WSN topology in accordance with an embodiment of the present disclosure.

FIG. 5 illustrates Simulated WSN topology in accordance with an embodiment of the present disclosure.

Experimental Findings and Analysis

The experimental configuration begins with an outline of the setup parameters. Subsequently, a detailed analysis of the dual stages of the DSMND model was presented. A comparative assessment of the scheme with MN detection methods was conducted to evaluate its effectiveness.

Experimental Setup

A WSN simulation was conducted using the Cooja simulator on the Contiki OS platform. Simulations were executed on a testbed equipped with an Intel Core i5-2450 M 2.5 GHz CPU, 3 MB cache, and 4 GB of RAM. The WSN covered an area spanning 500×500 m, comprising 50-250 SNs and 4-20 CHs. These nodes transmit data packets to a central base station using the Zigbee/IEEE 802.15.4 communication protocol. The simulation parameters in FIG. 14 were set according to the default values listed in Table. The reported results represent the averages obtained from 30 independent simulation runs using the proposed model.

To evaluate the accuracy of MN detection within a WSN, a comparative analysis was performed between our model and various ML and DL methods using the dataset provided in SensorNetGuard. The evaluation criteria included accuracy, detection time, and power consumption. FIG. 5 illustrates the simulated WSN topology, showing the SNs, CHs, and MNs.

Figure 6:
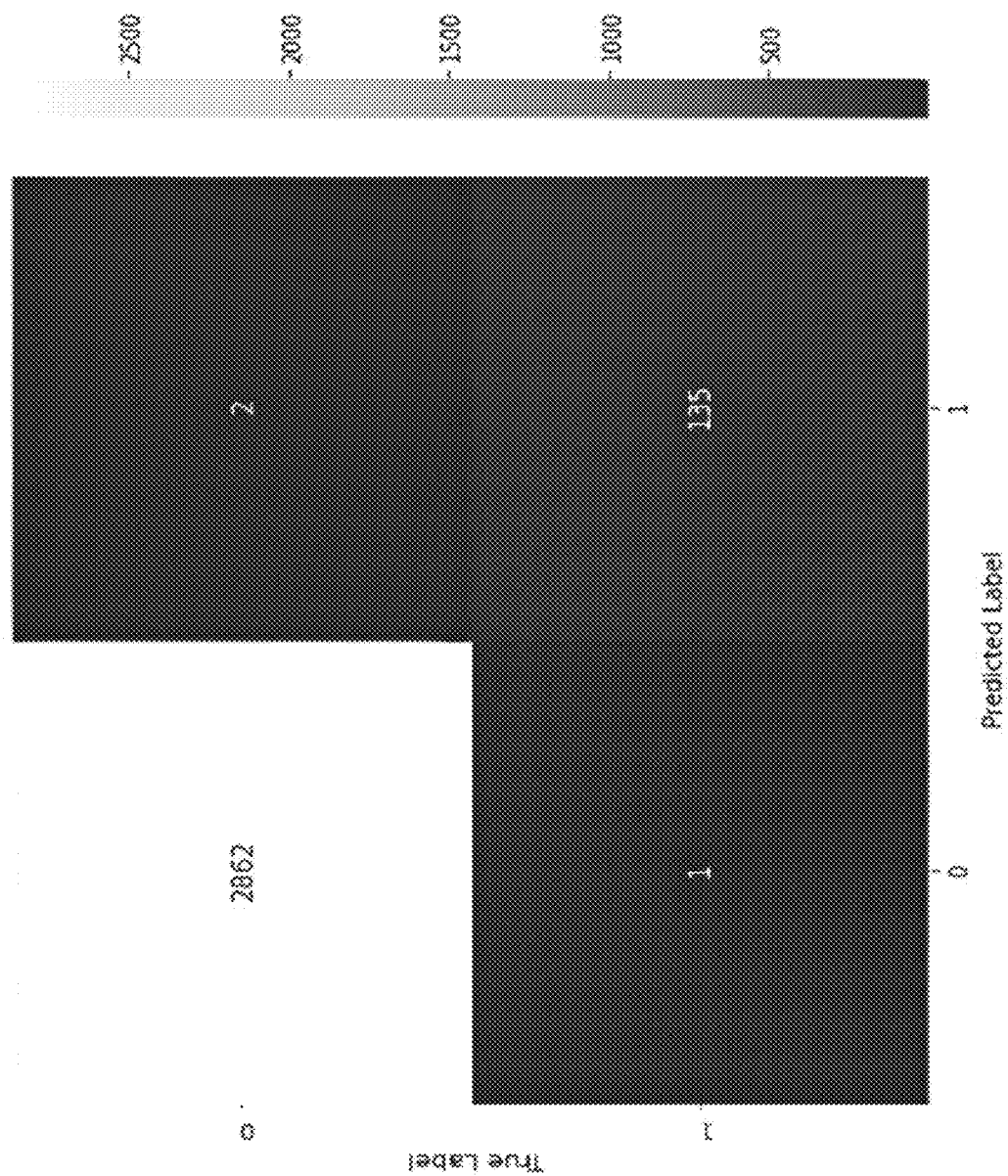
FIG. 6 illustrates Confusion Matrix of the Dynamic TH-DT Model in accordance with an embodiment of the present disclosure.

FIG. 6 illustrates Confusion Matrix of the Dynamic TH-DT Model in accordance with an embodiment of the present disclosure.

Evaluation Results

Figure 7:
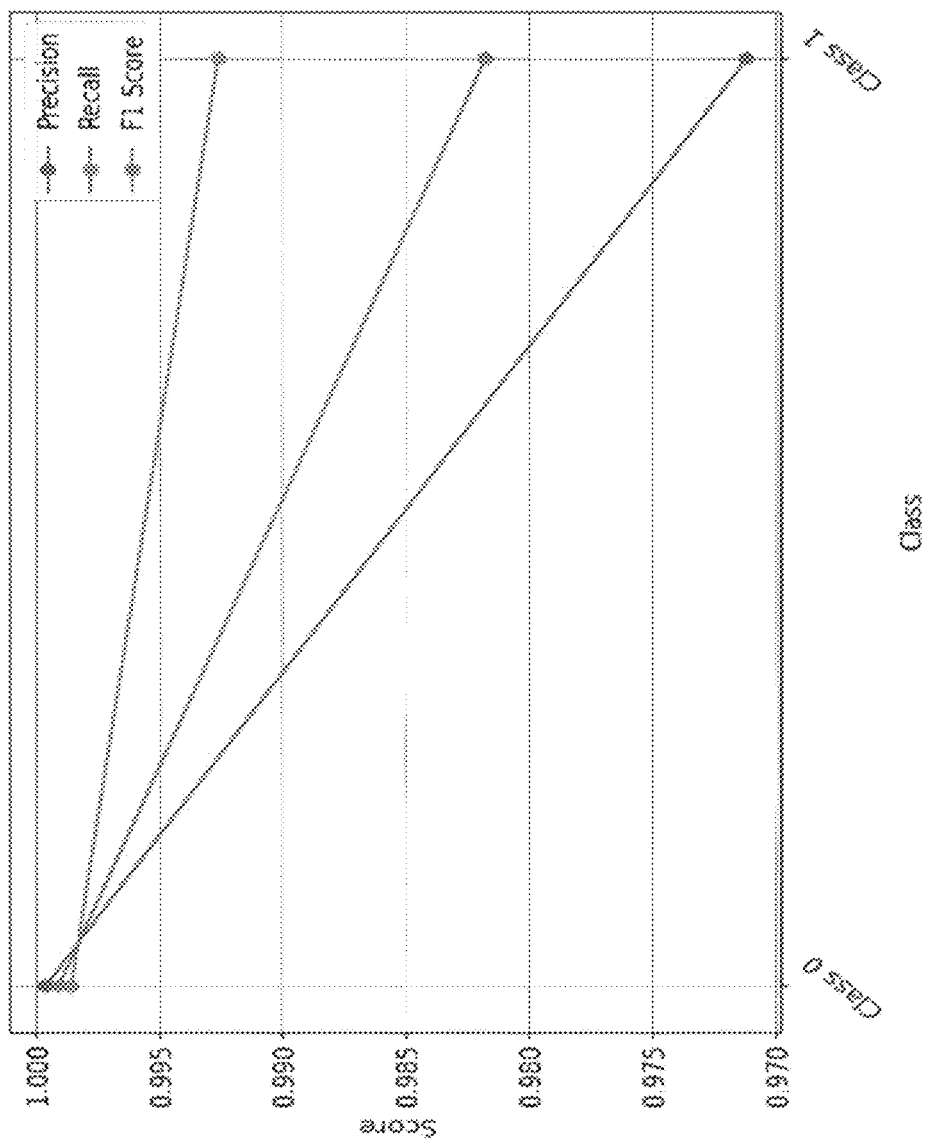
FIG. 7 illustrates Performance Metrics Results of the Dynamic TH-DT Model in accordance with an embodiment of the present disclosure.

At the onset of our experimental assessment, the performances of the proposed Dynamic TH-DT model at the CH level is compared. The results demonstrated remarkable proficiency in the correct detection of MNs within network clusters. The confusion matrix depicted in FIG. 6 illustrates the model's ability to effectively classify instances into malicious and non-malicious data points. When utilizing all available features, the model demonstrated a high level of accuracy, highlighting its robustness in distinguishing between classes. In addition to the accuracy, the performance of the model was assessed using the precision, recall, and F1 scores, as shown in FIG. 7. Precision is the ratio of accurately identified positive cases to all predicted positive cases. The F1 score, a metric that merges precision and recall, illustrates the balance between these two aspects achieved by the model. Furthermore, the recall rate, indicating the model's capability to correctly identify all positive instances, demonstrated a notably high value. These metrics collectively underscore the robustness of the model in accurately classifying instances and highlight its efficacy in identifying relevant data points.

FIG. 7 illustrates Performance Metrics Results of the Dynamic TH-DT Model in accordance with an embodiment of the present disclosure.

Figure 8:
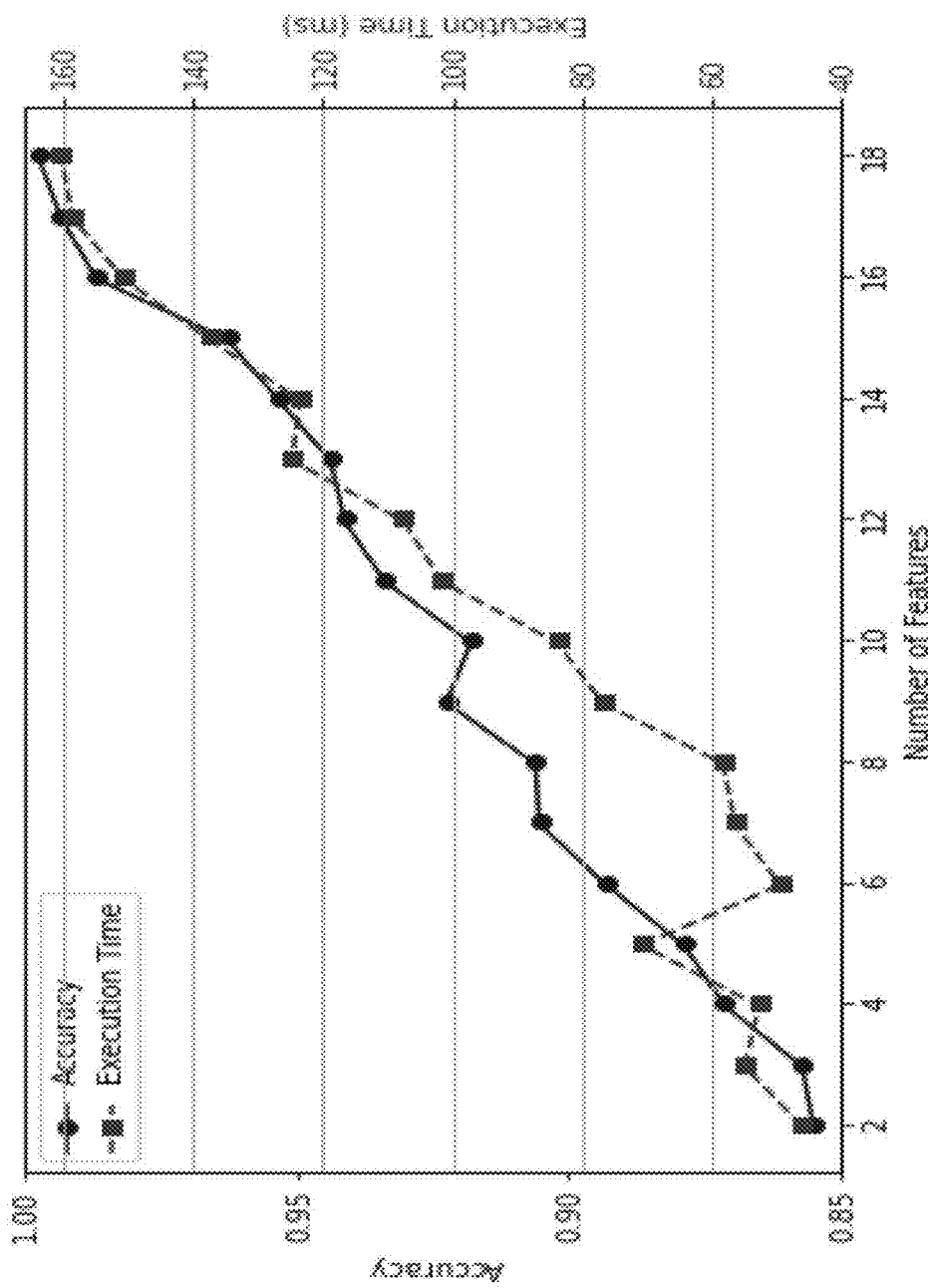
FIG. 8 illustrates Correlation between the Number of Features vs. Accuracy and Execution Time in Dynamic TH-DT in accordance with an embodiment of the present disclosure.

FIG. 8 illustrates Correlation between the Number of Features vs. Accuracy and Execution Time in Dynamic TH-DT in accordance with an embodiment of the present disclosure. Our experiments revealed a clear relationship between the feature count of the dataset and the accuracy of the model, presenting an intriguing trend. As the number of features expanded within the model, it notably influenced both the accuracy and computational demands. An increased number of features is directly correlated with increased accuracy rates. For instance, as illustrated in FIG. 8, an approximately 16% surge in accuracy is observed when transitioning from 2 to 18 features in the training model, in accordance with the hierarchical arrangement of the features depicted in FIG. 4. However, this notable enhancement in accuracy comes at the cost of a substantial increase in computational time, nearly tripling the processing duration. The expanded feature set required more intricate computations and managed larger data sizes during the processing of the model, resulting in extended processing times for analysis. Consequently, this prolonged processing duration significantly affects the power consumption of the CHs during MN detection.

In our proposal, leveraging only six features in the initial MN detection stage enables CHs to achieve an accuracy level of approximately 90% while reducing the execution time by half compared to employing the complete feature set. This significantly reduced the computational overhead associated with ML processing, thereby establishing a pragmatic tradeoff between accuracy and computational efficiency.

Figure 9:
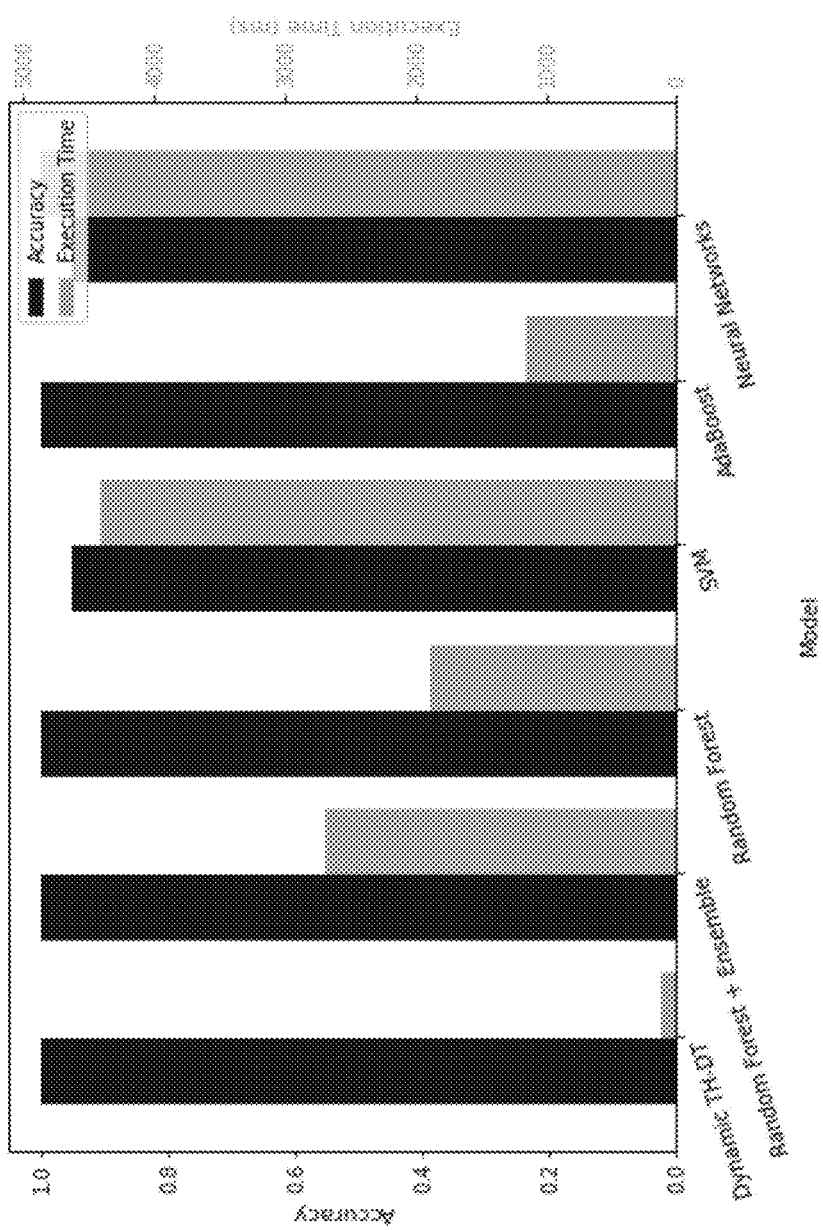
FIG. 9 illustrates Comparison of Accuracy and Execution Time for CH-level Dynamic TH-DT and ML Models in accordance with an embodiment of the present disclosure.

FIG. 9 illustrates Comparison of Accuracy and Execution Time for CH-level Dynamic TH-DT and ML Models in accordance with an embodiment of the present disclosure. In the following section, the performance of the proposed Dynamic TH-DT model is evaluated through a comprehensive comparative analysis with various classifiers. The experiment encompassed a diverse range of models, including ensemble RF and standalone classifiers such as RF, SVM, AdaBoost, and NNs. As depicted in FIG. 9, our Dynamic THDT model demonstrated competitive prowess, securing an average accuracy of 94% and maximum accuracy of approximately 99.5% when utilizing all available features. This accuracy closely aligns with other strong contenders such as RF and AdaBoost, which also achieved high accuracy when utilizing the features of the complete dataset. Notably, the Dynamic TH-DT model exhibited a significantly lower execution time of 124.63 ms on average across various feature ranges, spanning from 3 to 18. This is in contrast to models such as SVM, NNs, and the ensemble RF, which require significantly higher execution times, ranging from 1033 to 4331 ms in execution time when trained using all available features.

Figure 10:
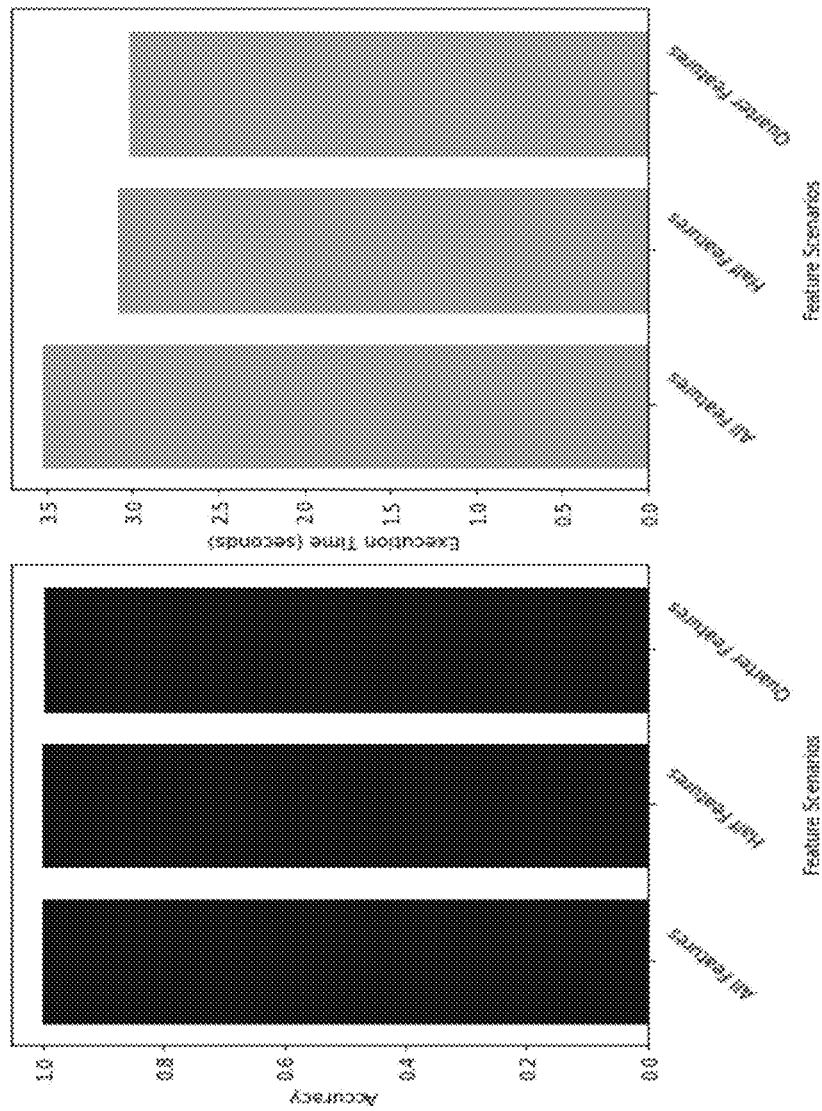
FIG. 10 illustrates Accuracy and Execution Time of the Server-side Hybrid CNN-RF with Full, Half, and Quarter Feature Sets in accordance with an embodiment of the present disclosure.

FIG. 10 illustrates Accuracy and Execution Time of the Server-side Hybrid CNN-RF with Full, Half, and Quarter Feature Sets in accordance with an embodiment of the present disclosure. In our comprehensive evaluation, the performance of the server-level Hybrid CNN-RF model is assessed across various feature scenarios to understand its adaptability under different feature dimensions. Our primary objective was to determine the robustness of the model in maintaining high classification accuracy despite the reduced availability of features in the SN data. Across diverse feature scenarios encompassing full, half, and quarter numbers of dataset features, the proposed Hybrid CNN-RF consistently demonstrated exceptional accuracy rates, achieving approximately 100% accuracy in all instances. These results highlight the model's ability to discern crucial patterns for accurate classification, demonstrating its resilience to reductions in the available features within the dataset. Moreover, despite applying the model to a resource-rich server, a proportional decrease is observed in the execution time as the feature dimensions were reduced. FIG. 10 summarizes the accuracy and execution time metrics for various feature scenarios.

Figure 11:
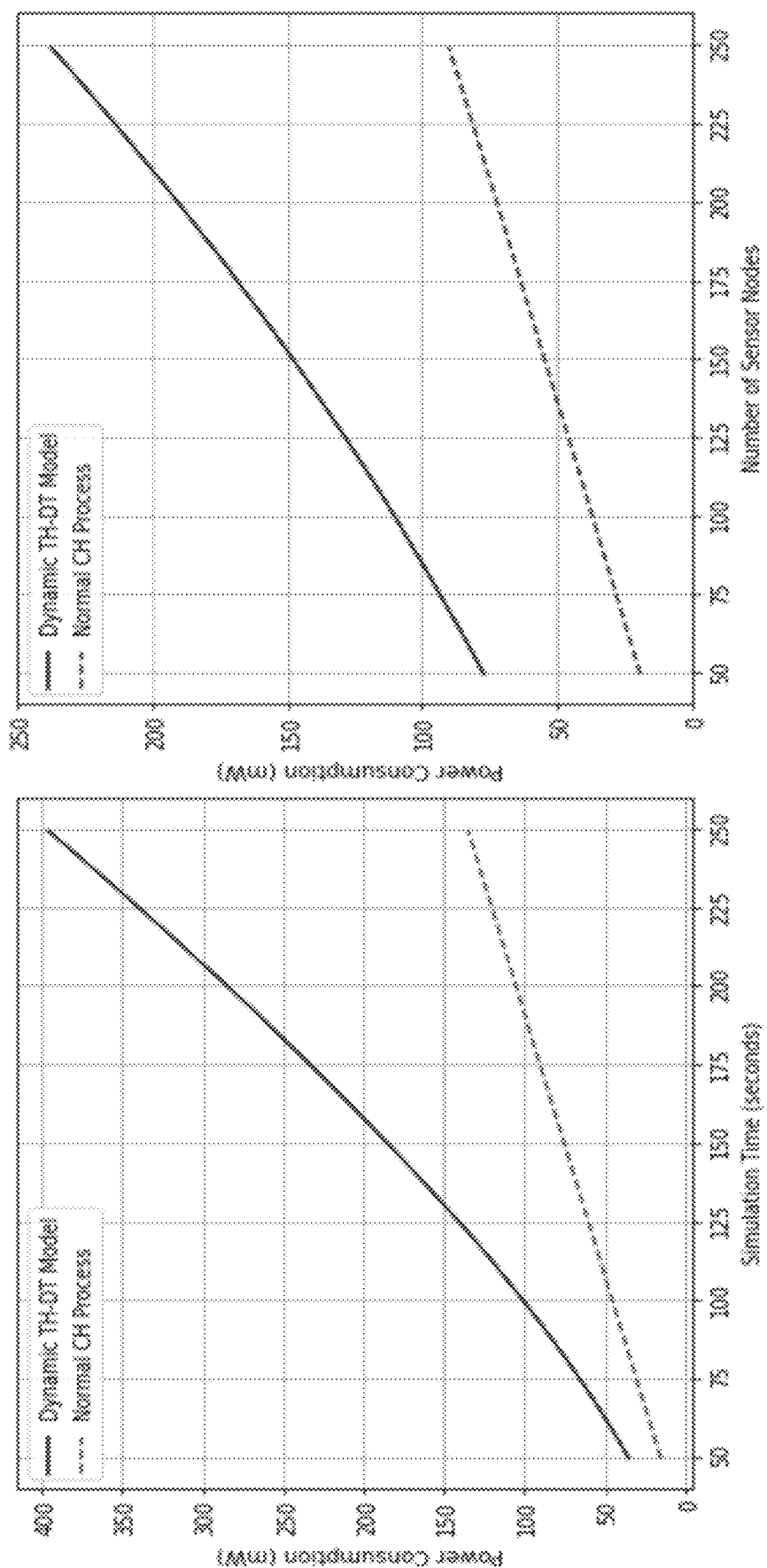
FIG. 11 illustrates (a) Simulation Time vs. Power Consumption, (b) Connected SNs vs. Power Consumption employing Dynamic TH-DT Model at the CH in accordance with an embodiment of the present disclosure.

FIG. 11 illustrates (a) Simulation Time vs. Power Consumption, (b) Connected SNs vs. Power Consumption employing Dynamic TH-DT Model at the CH in accordance with an embodiment of the present disclosure. In fact, the outcomes obtained from the Hybrid CNN-RF model deployed at the server side demonstrate the crucial role played by the recalculated weight values for each CH in amplifying the accuracy levels. This enhancement was accomplished using two primary approaches: augmenting the number of features and fine-tuning the threshold values. A notable improvement in accuracy was observed by recalculating and adjusting the CH weight values based on insights from the second-stage evaluation. This iterative process effectively identified scenarios in which an increase in feature numbers or refinement of threshold values significantly increased the accuracy of MN detection within the CH.

Following this, the impact of the Dynamic TH-DT model is evaluated on power consumption within the CH, considering diverse simulation durations and sensor node deployments, as presented in FIG. 11. In FIG. 11(a), an exploration of the relationship between the simulation time and power consumption for 100 SNs connected to a CH reveals distinct patterns. The figure also illustrates the power consumption of a typical CH process encompassing data aggregation from the associated nodes and transmission to the base station. Notably, the average power consumption recorded when utilizing different features was 43 mW at a simulation time of 50 s, escalating to 400 mW at 250 s, representing an approximately 2.7-fold increase compared with the power consumed using the standard CH process.

Similarly, FIG. 11(b) shows the power consumption with respect to the number of SNs connected to the CH when employing the Dynamic TH-DT model. The chart illustrates the power consumption of a typical CH process within a network with varying numbers of nodes linked to the CH engaged in regular network operations. The findings revealed that the model consumed an average of 78 mW of CH power with 50 connected nodes, escalating to 237 mW with 250 nodes connected to the CH, using a diverse set of features in the trained model. This increase represents an approximately threefold increase compared to the standard operational power of the CH when the same number of connected SNs was observed.

Figure 12:
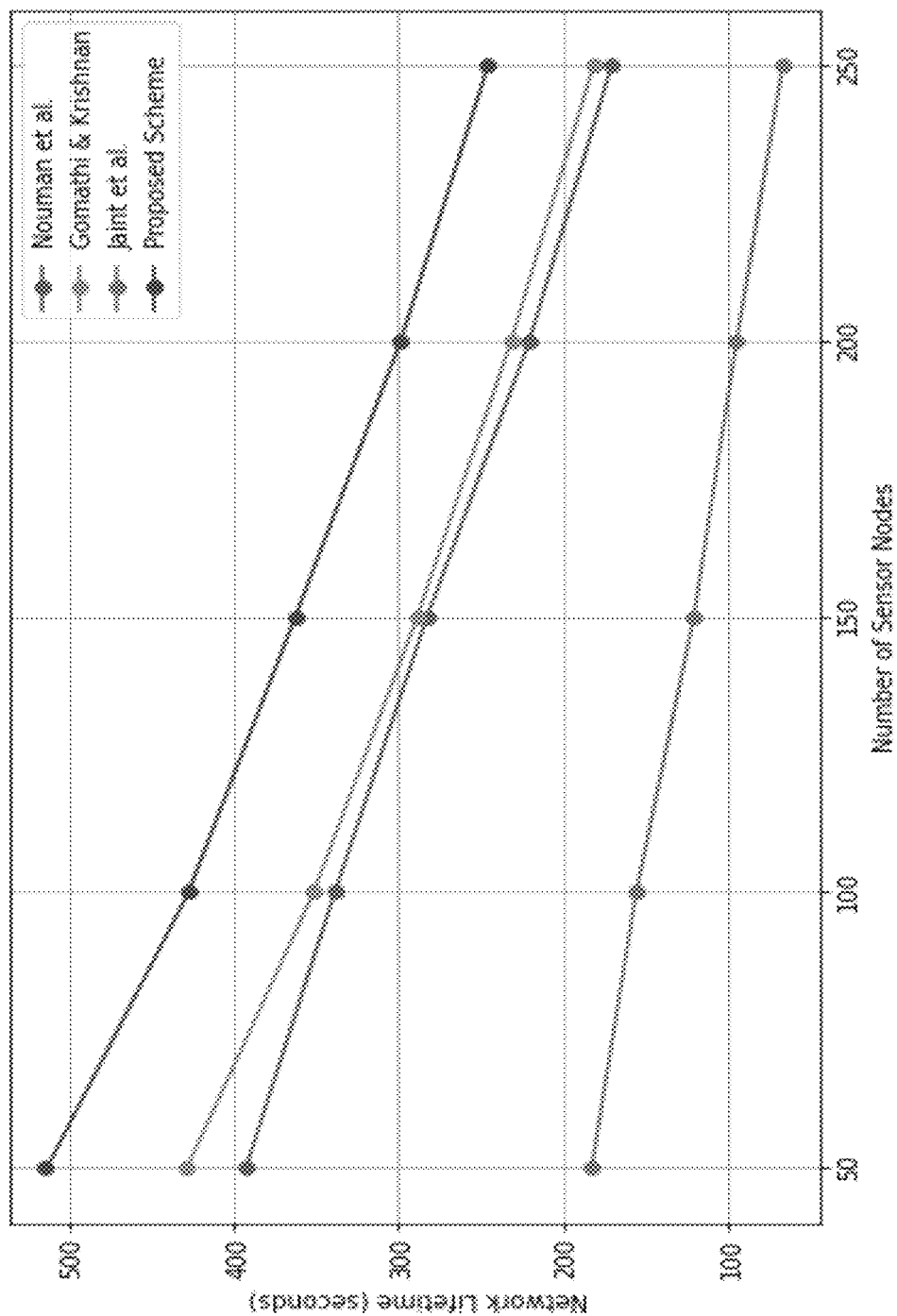
FIG. 12 illustrates Comparative Network Lifetime Analysis between our Scheme and Various MN Detection Schemes in WSN in accordance with an embodiment of the present disclosure.

FIG. 12 illustrates Comparative Network Lifetime Analysis between our Scheme and Various MN Detection Schemes in WSN in accordance with an embodiment of the present disclosure.

FIG. 12 demonstrates the substantial differences in network lifetimes among these methods. Notably, our proposed scheme consistently demonstrated extended network longevity compared with the shorter durations observed in other approaches. These findings underscore the potential effectiveness of our approach in enhancing network lifetime while implementing MN detection in WSN.

In summary, the DSMND architecture demonstrates exceptional performance in MN detection and introduces several key features that set it apart from existing methods. The dual-stage detection process enhances adaptability to varying network conditions, ensuring optimal resource allocation and real-time processing capabilities. Additionally, our approach utilizes a comprehensive feature set to identify nuanced behaviors indicative of malicious activities. Achieving a peak detection accuracy of 99.5%, the model significantly outperforms conventional methods. Its hybrid ML and DL techniques enhance both precision and computational efficiency. Notably, the architecture could achieve a remarkable reduction in CH power consumption by up to 70%, extending the overall network lifetime. The system's robustness against evasion techniques and the use of dynamic threshold mechanisms further ensure reliability in real-world applications. These innovations underscore the efficacy and practicality of the DSMND architecture as a compelling solution for addressing security threats in WSNs.

FIG. 13 illustrates a Table depicting Summary of Dataset Features for Malicious Node Detection in accordance with an embodiment of the present disclosure.

FIG. 14 illustrates a Table depicting Network simulation parameters employed in accordance with an embodiment of the present disclosure.

In this disclosure, the DSMND, a novel dual-stage architecture is introduced that integrates hybrid ML techniques within WSNs for MN detection. This scheme enhances accuracy while managing computational complexity through two detection stages. The initial CH-level stage employs adaptive dynamic threshold detection and DT techniques, whereas the server-side stage uses a Hybrid CNN-RF model for precise MN identification. Our evaluations reveal a significant relationship between the number of features, threshold levels, and accuracy, demonstrating that increasing features impacts accuracy rates. The initial stage optimizes feature counts, threshold values, and CH resource levels. The implementation of a modified and adaptable threshold feature set in the initial stage achieves a practical balance between precision and computational efficiency, improving CH's power consumption by about 70%. Insights from the Hybrid CNN-RF model emphasize the importance of recalculated weight values for individual CHs, notably enhancing accuracy. Moreover, the recalibration process from the second stage shows that adjustments to features and thresholds significantly enhance MN detection accuracy within the CH. The findings underscore the effectiveness of this dual-stage architecture, demonstrating competitive accuracy and reduced execution times across diverse feature ranges compared to various classifiers at the CH level. Additionally, the server-level Hybrid CNN-RF model consistently exhibits exceptional accuracy, even with reduced feature dimensions. This dual-stage architecture significantly improves MN detection, reduces CH power consumption, and increases network lifetime compared to existing methods.

Future research will focus on enhancing the energy efficiency of MN detection within WSNs by exploring power optimization strategies, including diverse SN integration, and assessing the adaptability of the model to various network topologies.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above about specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A system for detecting malicious nodes in a wireless sensor network (WSN), comprising:
    a plurality of sensor nodes configured to be deployed in the WSN;
    a data acquisition unit connected to the plurality of sensor nodes operably configured to:
        monitor the plurality of sensor nodes in the WSN to obtain node metrics comprising at least one of: packet rate, packet drop rate, packet duplication rate, signal strength, signal-to-noise ratio, error rate, central processing unit (CPU) usage, memory usage, and bandwidth usage for each of the plurality of nodes; and
        monitor the wireless sensor network to obtain network metrics comprising at least one of: data throughput, energy consumption rate, number of neighbors, route request frequency, route reply frequency, data transmission frequency, and data reception frequency;
    a ranking unit operably configured to rank the node metrics and the network metrics based on their statistical significance in identifying malicious nodes, using a chi-squared statistic or other statistical measure of independence from a target variable indicative of maliciousness;
    at least one cluster head (CH) coupled with the data acquisition unit and ranking unit, wherein the at least one CH is configured to:
        determine a resource weight based on at least one resource metric selected from node metrics and network metrics of the at least one CH; and
        perform a first-stage malicious node detection based on the calculated resource weight;
    a server in connection with the at least one CH, wherein the server is configured to:
        access results determined in the first-stage malicious node detection performed by the at least one CH; and
        perform a second-stage malicious node detection based on the received results, utilizing a combination of machine learning (ML) and deep learning (DL) techniques for enhanced detection accuracy.

2. The system of claim 1, wherein the first-stage malicious node detection performed by the at least one CH comprises: applying dynamic threshold detection to sensor data received from a subset of the plurality of sensor nodes using a plurality of dynamic thresholds, wherein the plurality of dynamic thresholds are dynamically adjusted based on the calculated resource weight.

3. The system of claim 2, wherein the first-stage malicious node detection further utilizes a hybrid machine learning (ML) technique to analyze the sensor data and the dynamic thresholds, wherein the hybrid ML technique utilized in the first-stage malicious node detection by the at least one CH comprises a decision tree (DT) classifier, wherein the decision tree (DT) classifier is configured to analyze data flagged by the dynamic threshold detection as potentially anomalous and classify sensor nodes as benign or malicious based on a rule set derived from training data, wherein the dynamic threshold detection and the decision tree (DT) classifier operate collaboratively, wherein the dynamic threshold detection flags potential anomalies based on current network conditions and the decision tree (DT) classifier analyzes the flagged anomalies to determine if they signify malicious behavior.

4. The system of claim 1, wherein the server is further configured to: update at least one threshold parameter used in the first-stage malicious node detection based on results from the second-stage malicious node detection.

5. The system of claim 1, wherein calculating the resource weight comprises:

monitoring the at least one resource metric of the CH selected from the group consisting of: resource utilization at the CH (RUCH), battery level of the CH (BtCH), connectivity status (Cst) representing a number of sensor nodes associated with the CH, and signal-to-noise ratio (SNR); and calculating a resource weight parameter (pr) based on the monitored resource metrics.

6. The system of claim 2, wherein the dynamic threshold detection in the first-stage malicious node detection is applied to a subset of features selected from a feature set comprising individual node metrics and network-wide metrics, to optimize resource utilization at the CH level, wherein the dynamic thresholds are initially calibrated based on system requirements and data features and subsequently adapted and adjusted based on evaluations related to node trust and detection of malicious nodes, wherein the evaluation related to node trust comprises assigning and updating trust values (T) to sensor nodes, wherein a higher trust value indicates greater sensor node reliability, wherein the dynamic thresholds are adjusted in response to changes in the trust values (T) of sensor nodes, such that threshold values are increased if a malicious node is detected or the trust value (T) falls below a threshold and threshold values are decreased if no malicious nodes are detected and the trust value (T) is high.

7. The system of claim 6, wherein the feature set comprises at least one of: packet rate, packet drop rate, packet duplication rate, signal strength, signal-to-noise ratio (SNR), data throughput, energy consumption rate, number of neighbors, route request frequency, route reply frequency, data transmission frequency, data reception frequency, error rate, CPU usage, memory usage, and bandwidth usage.

8. The system of claim 1, wherein the combination of ML and DL techniques utilized in the second-stage malicious node detection by the server comprises a hybrid Convolutional Neural Network and Random Forest (CNN-RF) model, wherein the CNN-RF model is activated upon receiving results from the first-stage malicious node detection indicating a potential malicious node or a low trust value for a sensor node, wherein the CNN-RF model comprises:

at least one Convolutional Neural Network (CNN) configured to extract feature vectors from a comprehensive dataset comprising features from the WSN nodes, wherein the at least one CNN comprises multiple convolutional layers, each convolutional layer consisting a plurality of filters, a kernel size, and a Rectified Linear Unit (ReLU) activation function; and a Random Forest (RF) classifier configured to classify sensor nodes as malicious or benign based on the feature vectors extracted by the CNN.

9. The system of claim 3, wherein the data acquisition unit is further configured to: continuously aggregate raw sensor node data received at predetermined intervals; pre-process the aggregated data by performing noise filtering through a median filter and normalization using min-max scaling prior to the any extraction of node and network metrics; wherein said pre-processing reduces false positive detections by removing spurious data points and normalizing data distributions to improve accuracy during malicious node detection, wherein the ranking unit is further configured to: perform an iterative chi-squared evaluation on historical sensor data received from the plurality of sensor nodes and network metrics periodically at runtime; adaptively update the statistical significance rankings of node and network metrics based on changing data patterns detected during network operation; wherein dynamically updated ranking enhances real-time adaptability of metrics employed in detecting evolving malicious node behaviors, and wherein the hybrid ML technique implemented by the at least one cluster head (CH) level further comprises: generating and updating an interpretable rule set from the decision tree (DT) classifier during runtime based on dynamic threshold detections flagged as anomalous; applying fuzzy logic decision mechanisms for borderline cases where DT classifier confidence falls below a predefined confidence threshold; wherein said fuzzy logic decisions dynamically weigh multiple node metrics and adaptively balance between sensitivity and specificity, enhancing a first-stage detection accuracy at the CH level.

10. The system of claim 8, wherein the CNN-RF model utilized in the second-stage malicious node detection further comprises: integrating a multi-scale convolutional feature extraction strategy, wherein convolutional layers concurrently process data inputs at multiple temporal scales to identify short-term anomalies and long-term behavioral changes; wherein extracted multi-scale feature vectors from convolutional layers are concatenated and provided as input to the Random Forest classifier, increasing precision by detecting both immediate threats and prolonged anomalous patterns in node behavior, and wherein the server updates threshold parameters through: executing a feedback loop configured to evaluate false positive and false negative rates from the second-stage malicious node detection over sliding historical windows; automatically adjusting threshold parameters using reinforcement learning wherein reward signals correspond inversely to cumulative detection errors; wherein said reinforcement learning dynamically optimizes thresholds in a self-adaptive manner to minimize misclassification rates, significantly enhancing system resilience against new malicious behaviors.

11. The system of claim 6, wherein the at least one CH is further configured to: perform compressed sensing-based data summarization to reduce a dimensionality of node and network metrics transmitted to the server; wherein the compressed sensing employs sparse signal reconstruction algorithms enabling CH-level data reduction without loss of critical anomaly indicators, thus effectively preserving detection accuracy while minimizing communication overhead, and wherein the trust values (T) assigned to sensor nodes at the CH level are further updated through: integrating blockchain-based trust validation wherein each sensor node periodically appends cryptographic signatures representing recent activity patterns onto a distributed ledger; the CH querying the distributed ledger to verify and cross-check historical activity logs submitted by sensor nodes against real-time observed behaviors.

12. The system of claim 8, wherein the server is further configured to: perform federated incremental learning by locally training CNN-RF models across distributed cluster heads without requiring raw data transmission; aggregating locally trained model parameters at regular intervals and updating a global model deployed on the server; redistributing optimized global model parameters back to the cluster heads to enhance their detection accuracy; wherein federated incremental learning securely maintains data privacy and reduces communication costs while achieving continuous, distributed malicious node detection model improvement, and wherein decision results from a decision tree (DT) classifier at the first-stage detection are further combined with predictions from the CNN-RF model at the second-stage detection through: employing ensemble stacking using a meta-classifier neural network at the server configured to receive outputs from both first-stage DT classifier and second-stage CNN-RF model; wherein the meta-classifier neutral network adaptively assigns weighting factors to individual stage decisions based on their historical reliability and prediction accuracy, thus integrating both stage predictions into a final consolidated decision to further reduce false alarms and improve precision in detecting malicious nodes.

13. The system of claim 1, wherein the ranking unit further comprises: performing predictive feature importance analysis by employing an explainable artificial intelligence (XAI) recalibration, wherein SHapley Additive explanations (SHAP) values quantify contributions of each feature to a detection outcome; continuously recalibrating and optimizing feature selection based on SHAP value rankings to highlight critical metrics actively contributing to malicious node identification; wherein the XAI recalibration enhances transparency and interpretability, facilitating systematic refinement of selected metrics during network runtime, and wherein the server is further configured to: perform temporal drift detection by analyzing historical detection outcomes to identify changes in node behavior distributions indicative of emerging malicious patterns, wherein upon detection of a drift exceeding a predetermined threshold, an automatic retraining trigger activates an incremental model updating process utilizing recent data, wherein said drift detection and incremental model updating proactively adapt a second-stage ML-DL detection model to evolving threat behaviors, significantly improving responsiveness to previously unknown malicious activities, wherein the at least one CH is further configured to: implement a proactive resource allocation strategy that dynamically redistributes computational tasks and detection workloads among neighboring CHs based on real-time assessments of each CH's resource metrics, wherein a resource allocation decision employs a weighted multi-objective optimization algorithm considering CH battery status, CPU load, bandwidth availability, and connectivity strength.

14. The system of claim 2, wherein dynamic threshold detection and the hybrid ML technique at the CH further comprise: incorporating real-time node context-awareness through monitoring spatial correlation metrics computed based on signal propagation characteristics and distances between sensor nodes, wherein thresholds for node behavior are dynamically adjusted by accounting for expected variations due to environmental and physical changes affecting signal quality and network topology, wherein contextual spatial awareness significantly reduces false positives caused by temporary environmental interference or legitimate network topology variations, and wherein the data acquisition unit is further configured to: employ adaptive data sampling intervals wherein sampling frequency of node and network metrics is automatically increased upon detecting suspicious node behaviors or threshold violations and reduced during normal operations, wherein adaptive sampling intervals are determined using reinforcement learning agents deployed at the CH that optimize sampling frequency based on reward functions designed to balance detection accuracy against resource utilization and communication overhead.

15. The system of claim 1, wherein the CH further comprises: an anomaly caching mechanism configured to temporarily store initial anomaly detection events flagged by dynamic threshold detection before transmission to the server, wherein cached anomalies undergo temporal correlation analysis using short-time statistical methods, including moving-window variance and mean-shift clustering, to reduce redundant transmissions by identifying and merging related events, wherein said anomaly caching and correlation analysis reduces communication bandwidth consumption and prevents redundant alerts, significantly optimizing data transmission efficiency.

16. The system of claim 3, wherein the second-stage malicious node detection is further enhanced by: integrating an attention mechanism within CNN layers that dynamically assigns higher weights to features exhibiting significant variations between benign and malicious node behaviors, wherein said attention mechanism leverages a self-attention matrix derived from historical detection outcomes to continuously refine feature emphasis, improving feature representation accuracy and detection sensitivity, thus enabling rapid identification and classification of subtle malicious patterns, and wherein the hybrid ML technique at the CH further comprises: executing online hyperparameter tuning utilizing Bayesian optimization algorithms periodically to optimize decision-tree parameters, including tree depth, minimum samples per split, and split criteria, wherein Bayesian optimization proactively updates hyperparameters by modeling relationships between hyperparameter choices and detection accuracy outcomes obtained from recent detection events, wherein the ranking unit is further configured to: perform unsupervised anomaly detection on feature sets through Isolation Forest algorithms during idle network periods, detecting previously unclassified anomalous patterns within node and network metrics, wherein detected anomalies identified by Isolation Forests trigger supplementary supervised labeling and inclusion into training datasets, incrementally expanding labeled anomaly data and continuously refining an accuracy of ML-DL detection models.

17. The system of claim 6, wherein the evaluation related to node trust is further performed by: integrating behavior trajectory modeling that records sequential metric changes of nodes to generate temporal profiles indicative of typical versus suspicious node operations, wherein Hidden Markov Models (HMMs) analyze these sequential behavioral trajectories to identify state transitions characteristic of compromised or potentially malicious sensor nodes, and wherein the server is further configured to: utilize multi-agent reinforcement learning wherein agents deployed at CH-level interact collaboratively by exchanging detection policy outcomes via lightweight communication protocols, wherein each CH agent locally updates policies based on global reward signals shared from the server reflecting overall network-level detection effectiveness and resource efficiency, thus enabling collective improvement of detection strategies across distributed network nodes through decentralized collaborative learning.

18. A method for detecting malicious nodes in a wireless sensor network (WSN) using system as claimed in claim 1, comprising:
calculating, by at least one cluster head (CH) in the WSN, a resource weight based on at least one resource metric of the CH, wherein the at least one resource metric of the CH comprises at least one of: resource utilization at the CH (RUCH), battery level of the CH (BtCH), connectivity status (Cst) representing a number of sensor nodes associated with the CH, and signal-to-noise ratio (SNR);
performing, by the at least one CH, a first-stage malicious node detection based on the calculated resource weight by applying dynamic threshold detection to sensor data received at the CH and utilizing a hybrid machine learning (ML) technique to analyze the sensor data and a plurality of dynamic thresholds at the CH level, wherein the plurality of dynamic thresholds are dynamically adjusted based on the calculated resource weight;

performing, by a server communicatively coupled with the at least one CH, a second-stage malicious node detection based on results from the first-stage malicious node detection, wherein the second-stage malicious node detection utilizes a combination of machine learning (ML) and deep learning (DL) techniques for enhanced detection accuracy; and updating at least one threshold parameter used in the first-stage malicious node detection based on results from the second-stage malicious node detection.

19. The method of claim 18, wherein the hybrid ML technique utilized in the first-stage malicious node detection comprises a decision tree (DT) classification method, wherein the dynamic threshold detection in the first-stage malicious node detection is applied to a subset of features selected from a feature set comprising individual node metrics and network-wide metrics, to optimize resource utilization by the at least one CH, wherein the feature set comprises at least one of: packet rate, packet drop rate, packet duplication rate, signal strength, signal-to-noise ratio (SNR), data throughput, energy consumption rate, number of neighbors, route request frequency, route reply frequency, data transmission frequency, data reception frequency, error rate, CPU usage, memory usage, and bandwidth usage, wherein the combination of ML and DL techniques utilized in the second-stage malicious node detection by the server comprises a hybrid Convolutional Neural Network and Random Forest (CNN-RF) model.

20. A system for detecting malicious nodes in a wireless sensor network (WSN), comprising:

a plurality of sensor nodes deployed in the WSN;

metric monitoring and processing circuitry connected to the plurality of sensor nodes being operably configured to:

monitor the plurality of sensor nodes in the WSN to obtain node metrics comprising at least one of: packet rate, packet drop rate, packet duplication rate, signal strength, signal-to-noise ratio, error rate, central processing unit (CPU) usage, memory usage, and bandwidth usage for each of the plurality of nodes;

monitor the WSN to obtain network metrics comprising at least one of: data throughput, energy consumption rate, number of neighbors, route request frequency, route reply frequency, data transmission frequency, and data reception frequency;

rank the node metrics and the network metrics based on their statistical significance in identifying malicious nodes, using a statistical measure of independence from a target variable indicative of maliciousness;

determine a resource weight based on at least one resource metric selected from the node metrics and the network metrics;

perform a first-stage malicious node detection based on the resource weight as determined; and perform a second-stage malicious node detection based on results of the first-stage malicious node detecting utilizing a combination of machine learning (ML) and deep learning (DL) models for enhanced detection accuracy.

* * * * *